(12) United States Patent
McNulty

(10) Patent No.: US 11,818,194 B2
(45) Date of Patent: *Nov. 14, 2023

(54) APPARATUS, METHOD AND SYSTEM FOR A TUNNELING CLIENT ACCESS POINT

(71) Applicant: IOENGINE LLC, Norwalk, CT (US)

(72) Inventor: Scott McNulty, Rowayton, CT (US)

(73) Assignee: IOENGINE, LLC, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/300,761

(22) Filed: Apr. 14, 2023

(65) Prior Publication Data

US 2023/0254358 A1    Aug. 10, 2023

Related U.S. Application Data

(63) Continuation of application No. 17/409,761, filed on Aug. 23, 2021, now Pat. No. 11,632,415, which is a
(Continued)

(51) Int. Cl.
*H04L 9/40* (2022.01)
*H04L 67/04* (2022.01)
(Continued)

(52) U.S. Cl.
CPC ............ *H04L 67/01* (2022.05); *H04L 9/3226* (2013.01); *H04L 9/3247* (2013.01);
(Continued)

(58) Field of Classification Search
CPC ............ H04L 2209/56; H04L 2209/76; H04L 2209/80; H04L 63/0272; H04L 63/0428;
(Continued)

(56) References Cited

U.S. PATENT DOCUMENTS 5,596,718 A    1/1997 Boebert
5,613,012 A    3/1997 Hoffman
(Continued)

FOREIGN PATENT DOCUMENTS

CA    2321805 A1    3/2002
EP    0971327 A2    1/2000
(Continued)

OTHER PUBLICATIONS

Inter Partes Review No. IPR2021-01551: Denial Decision May 5, 2023 (18 pages).
(Continued)

*Primary Examiner* — Alina A Boutah

(74) *Attorney, Agent, or Firm* — Koffsky Schwalb LLC; Mark I. Koffsky

(57) ABSTRACT

The disclosure details the implementation of an apparatus, method, and system comprising a portable device configured to communicate with a terminal and a network server, and execute stored program code in response to user interaction with an interactive user interface. The portable device contains stored program code configured to render an interactive user interface on a terminal output component to enable the user the control processing activity on the portable device and access data and programs from the portable device and a network server.

30 Claims, 10 Drawing Sheets

Related U.S. Application Data continuation of application No. 17/241,038, filed on Apr. 26, 2021, now Pat. No. 11,102,335, which is a continuation of application No. 16/516,244, filed on Jul. 18, 2019, now Pat. No. 10,992,786, which is a continuation of application No. 15/712,780, filed on Sep. 22, 2017, now Pat. No. 10,447,819, which is a continuation of application No. 14/721,540, filed on May 26, 2015, now Pat. No. 9,774,703, which is a continuation of application No. 13/960,514, filed on Aug. 6, 2013, now Pat. No. 9,059,969, which is a continuation of application No. 12/950,321, filed on Nov. 19, 2010, now Pat. No. 8,539,047, which is a continuation of application No. 10/807,731, filed on Mar. 23, 2004, now Pat. No. 7,861,006.

(51) Int. Cl.
  *H04L 67/01* (2022.01)
  *H04L 67/141* (2022.01)
  *H04L 9/32* (2006.01)
  *H04L 65/61* (2022.01)

(52) U.S. Cl.
  CPC ...... *H04L 63/0272* (2013.01); *H04L 63/0428* (2013.01); *H04L 65/61* (2022.05); *H04L 67/04* (2013.01); *H04L 67/141* (2013.01); *H04L 2209/56* (2013.01); *H04L 2209/76* (2013.01); *H04L 2209/80* (2013.01)

(58) Field of Classification Search
  CPC ......... H04L 65/61; H04L 67/01; H04L 67/04; H04L 67/141; H04L 9/3226; H04L 9/3247
  See application file for complete search history.

(56) References Cited

U.S. PATENT DOCUMENTS

| | | | |
|---|---|---|---|
| 5,745,710 A | 4/1998 | Clanton, III | |
| 5,784,461 A | 7/1998 | Shaffer | |
| 5,960,085 A | 9/1999 | De La Huerga | |
| 5,990,927 A | 11/1999 | Hendricks | |
| 5,999,624 A | 12/1999 | Hopkins | |
| 6,055,314 A * | 4/2000 | Spies | G07F 7/1008 380/278 |
| 6,065,679 A | 5/2000 | Levie | |
| 6,067,076 A | 5/2000 | Hocker | |
| 6,088,805 A | 7/2000 | Davis | |
| 6,097,390 A | 8/2000 | Marks | |
| 6,098,097 A | 8/2000 | Dean | |
| 6,105,042 A | 8/2000 | Aganovic | |
| 6,128,738 A | 10/2000 | Doyle | |
| 6,134,662 A | 10/2000 | Levy | |
| 6,199,108 B1 | 3/2001 | Casey | |
| 6,219,793 B1 | 4/2001 | Li | |
| 6,233,568 B1 | 5/2001 | Kara | |
| 6,324,338 B1 | 11/2001 | Wood | |
| 6,362,894 B1 | 3/2002 | Shima | |
| 6,385,729 B1 * | 5/2002 | DiGiorgio | H04L 63/102 713/172 |
| 6,467,087 B1 | 10/2002 | Yang | |
| 6,487,657 B1 | 11/2002 | Brockmann | |
| 6,523,113 B1 | 2/2003 | Wehrenberg | |
| 6,547,130 B1 | 4/2003 | Shen | |
| 6,681,259 B1 | 1/2004 | Lemilainen | |
| 6,731,312 B2 | 5/2004 | Robbin | |
| 6,732,158 B1 | 5/2004 | Hesselink | |
| 6,732,278 B2 | 5/2004 | Baird, III | |
| 6,748,541 B1 | 6/2004 | Margalit | |
| 6,751,734 B1 | 6/2004 | Uchida | |
| 6,754,831 B2 | 6/2004 | Brownell | |
| 6,763,399 B2 | 7/2004 | Margalit | |
| 6,799,077 B1 | 9/2004 | Hauet | |
| 6,819,219 B1 | 11/2004 | Bolle | |
| 6,917,962 B1 | 7/2005 | Cannata | |
| 6,927,770 B2 | 8/2005 | Ording | |
| 6,928,463 B1 | 8/2005 | Tene | |
| 6,970,927 B1 | 11/2005 | Stewart | |
| 6,983,050 B1 | 1/2006 | Yacobi | |
| 6,986,030 B2 | 1/2006 | Shmueli | |
| 7,032,240 B1 | 4/2006 | Cronce | |
| 7,051,157 B2 | 5/2006 | James | |
| 7,103,772 B2 | 9/2006 | Joergensen | |
| 7,178,028 B2 | 2/2007 | Go | |
| 7,178,035 B1 | 2/2007 | Glen | |
| 7,178,724 B2 | 2/2007 | Tamagno | |
| 7,213,766 B2 | 5/2007 | Ryan | |
| 7,242,766 B1 | 7/2007 | Lyle | |
| 7,272,723 B1 * | 9/2007 | Abbott | G06F 21/78 709/224 |
| 7,308,584 B2 | 12/2007 | Himmel | |
| 7,310,734 B2 | 12/2007 | Boate | |
| 7,345,671 B2 | 3/2008 | Robbin | |
| 7,383,446 B1 | 6/2008 | Hatanaka | |
| 7,454,783 B2 | 11/2008 | Dupouy | |
| 7,546,340 B2 | 6/2009 | Terasawa | |
| 7,549,161 B2 | 6/2009 | Poo | |
| 7,558,953 B2 | 7/2009 | Osthoff | |
| 7,634,090 B2 | 12/2009 | Kobayashi | |
| 7,762,470 B2 | 7/2010 | Finn | |
| 7,765,326 B2 | 7/2010 | Robbin | |
| 7,773,860 B2 | 8/2010 | Wood | |
| 7,861,006 B2 * | 12/2010 | McNulty | H04L 9/3226 713/150 |
| 7,962,173 B2 | 6/2011 | Oshima | |
| 7,979,700 B2 | 7/2011 | Elazar | |
| 8,539,047 B2 | 9/2013 | McNulty | |
| 8,595,488 B2 | 11/2013 | Elazar | |
| 8,612,511 B2 | 12/2013 | Friedrich | |
| 9,059,969 B2 * | 6/2015 | McNulty | H04L 9/3226 |
| 9,497,796 B2 | 11/2016 | Fujita | |
| 9,774,703 B2 * | 9/2017 | McNulty | H04L 9/3247 |
| 10,397,374 B2 * | 8/2019 | McNulty | H04L 63/0272 |
| 10,447,819 B2 * | 10/2019 | McNulty | H04L 67/01 |
| 10,972,584 B2 * | 4/2021 | McNulty | H04L 67/141 |
| 10,992,786 B2 * | 4/2021 | McNulty | H04L 63/0428 |
| 11,082,537 B1 * | 8/2021 | McNulty | H04L 65/61 |
| 11,102,335 B1 * | 8/2021 | McNulty | H04L 9/3226 |
| 11,632,415 B2 * | 4/2023 | McNulty | H04L 9/3226 709/203 |
| 2001/0003846 A1 | 6/2001 | Rowe | |
| 2001/0010689 A1 | 8/2001 | Awater | |
| 2001/0030959 A1 | 10/2001 | Ozawa | |
| 2001/0035814 A1 | 11/2001 | Uchida | |
| 2001/0044896 A1 | 11/2001 | Schwartz | |
| 2001/0047393 A1 | 11/2001 | Arner | |
| 2002/0000491 A1 | 1/2002 | Nieberle | |
| 2002/0004912 A1 | 1/2002 | Fung | |
| 2002/0014791 A1 | 2/2002 | Choi | |
| 2002/0037081 A1 | 3/2002 | Rogoff | |
| 2002/0044663 A1 | 4/2002 | King | |
| 2002/0046292 A1 | 4/2002 | Tennison | |
| 2002/0057893 A1 | 5/2002 | Wood | |
| 2002/0065872 A1 * | 5/2002 | Genske | G06F 9/4411 709/202 |
| 2002/0073340 A1 | 6/2002 | Mambakkam | |
| 2002/0080090 A1 | 6/2002 | Borgstoem | |
| 2002/0092028 A1 | 7/2002 | Lin | |
| 2002/0099665 A1 | 7/2002 | Burger | |
| 2002/0104091 A1 | 8/2002 | Prabhu | |
| 2002/0144265 A1 * | 10/2002 | Connelly | H04N 21/482 725/39 |
| 2002/0147912 A1 * | 10/2002 | Shmueli | G06F 21/602 713/182 |
| 2002/0162112 A1 | 10/2002 | Javed | |
| 2002/0169002 A1 | 11/2002 | Imbrie | |
| 2002/0169980 A1 * | 11/2002 | Brownell | H04L 63/0272 726/4 |
| 2002/0174345 A1 | 11/2002 | Patel | |
| 2002/0184349 A1 | 12/2002 | Manukyan | |
| 2002/0194499 A1 | 12/2002 | Audebert | |

(56) References Cited

U.S. PATENT DOCUMENTS

| | | |
|---|---|---|
| 2003/0005310 A1 | 1/2003 | Shinzaki |
| 2003/0005337 A1 | 1/2003 | Poo |
| 2003/0005827 A1 | 1/2003 | Kahler |
| 2003/0018543 A1* | 1/2003 | Alger ................. G06Q 30/0633 705/26.1 |
| 2003/0020813 A1* | 1/2003 | Iida ................... H04N 1/00148 348/207.99 |
| 2003/0028649 A1 | 2/2003 | Uhlik |
| 2003/0028650 A1 | 2/2003 | Chen |
| 2003/0050019 A1 | 3/2003 | Dowling |
| 2003/0055735 A1 | 3/2003 | Cameron |
| 2003/0058274 A1 | 3/2003 | Hill |
| 2003/0097655 A1 | 5/2003 | Novak |
| 2003/0145044 A1 | 7/2003 | Raivisto |
| 2003/0158891 A1 | 8/2003 | Lei |
| 2003/0167318 A1 | 9/2003 | Robbin |
| 2003/0182456 A1 | 9/2003 | Lin |
| 2004/0003250 A1 | 1/2004 | Kindberg |
| 2004/0019570 A1 | 1/2004 | Bolle |
| 2004/0039932 A1* | 2/2004 | Elazar ..................... G06F 21/10 726/26 |
| 2004/0044897 A1 | 3/2004 | Lum |
| 2004/0046783 A1 | 3/2004 | Montebovi |
| 2004/0055446 A1 | 3/2004 | Robbin |
| 2004/0064694 A1 | 4/2004 | Lee |
| 2004/0088510 A1 | 5/2004 | Hori |
| 2004/0123113 A1 | 6/2004 | Mathiassen |
| 2004/0125822 A1 | 7/2004 | Jun |
| 2004/0127254 A1 | 7/2004 | Chang |
| 2004/0163101 A1 | 8/2004 | Swix |
| 2004/0234071 A1 | 11/2004 | Bae |
| 2004/0250273 A1 | 12/2004 | Swix |
| 2005/0062888 A1 | 3/2005 | Wood |
| 2005/0120232 A1 | 6/2005 | Hori |
| 2005/0132183 A1 | 6/2005 | Gearhart |
| 2005/0172075 A1 | 8/2005 | Marcus |
| 2005/0197859 A1 | 9/2005 | Wilson |
| 2005/0198221 A1 | 9/2005 | Manchester |
| 2005/0213597 A1 | 9/2005 | McNulty |
| 2006/0052085 A1 | 3/2006 | Gregrio Rodriguez |
| 2006/0071066 A1 | 4/2006 | Vanzini |
| 2006/0097037 A1 | 5/2006 | Sakamura |
| 2006/0294249 A1 | 12/2006 | Oshima |
| 2007/0038870 A1 | 2/2007 | Ciesinger |
| 2007/0274291 A1 | 11/2007 | Diomelli |
| 2008/0233942 A9 | 9/2008 | Kim |
| 2011/0131292 A1 | 6/2011 | McNulty |
| 2014/0172958 A1 | 6/2014 | McNulty |
| 2015/0334208 A1 | 11/2015 | McNulty |
| 2018/0013863 A1 | 1/2018 | McNulty |
| 2018/0013864 A1 | 1/2018 | McNulty |
| 2019/0342427 A1 | 11/2019 | McNulty |
| 2020/0028940 A1 | 1/2020 | McNulty |
| 2021/0227052 A1 | 7/2021 | McNulty |
| 2021/0250426 A1 | 8/2021 | McNulty |
| 2021/0385300 A1 | 12/2021 | McNulty |

FOREIGN PATENT DOCUMENTS

| | | |
|---|---|---|
| EP | 1001329 A2 | 5/2000 |
| EP | 1168137 | 1/2002 |
| WO | 0049505 | 8/2000 |

OTHER PUBLICATIONS

Inter Partes Review No. IPR2021-01552: Denial Decision May 5, 2023 (20 pages).

Inter Partes Review No. IPR2021-01553: Denial Decision May 5, 2023 (19 pages).

Inter Partes Review No. IPR2021-01554: Denial Decision May 5, 2023 (19 pages).

Jon L. Jacoby, M-Systems Flash Disk Pioneers, "Using MyKey", Copyright 2003 M-Systems Flash Disk Pioneers, Ltd., 23 pages.

Jon L. Jacoby, Welcome to M-Systems DiskOnKey Site, "Product & Solutions", https://web/archive.org/web/20021202082914/http://www.diskonkey.com/prod-dok.asp, 1 page.

Jon L. Jacoby, Welcome to M-Systems DiskOnKey Site, https://web/archive.org/web/20021202082914/http://www.diskonkey.com/prod-dok.asp, 2 pages.

Jurgensen, et al, "Smart Cards," The Developer's Toolkit, Prentice Hall PTR, 2002, INGEN-0081268, 45 pages.

Jurgensen, et al, "SmartCards: the developer's toolkit," Public Catalog, Copyright, United States Copyright Office, dated Jul. 30, 2002, INGEN-0081313, 1 page.

Jury Trial Demanded, Confidential, Plaintiff Ioengine, LLC's Initial Claim Charts, dated Oct. 29, 2018, INGEN-0081405, 7 pages.

Jury Trial Demanded, Defendant Roku Inc.'S Preliminary Invalidity Contentions, dated Apr. 28, 2022 (PART 1 of 10—462 pages of 4594).

Jury Trial Demanded, Defendant Roku Inc.'S Preliminary Invalidity Contentions, dated Apr. 28, 2022 (PART 10 of 10—394 pages of 4594).

Jury Trial Demanded, Defendant Roku Inc.'S Preliminary Invalidity Contentions, dated Apr. 28, 2022 (PART 2 of 10—460 pages of 4594).

Jury Trial Demanded, Defendant Roku Inc.'S Preliminary Invalidity Contentions, dated Apr. 28, 2022 (PART 3 of 10—474 pages of 4594).

Jury Trial Demanded, Defendant Roku Inc.'S Preliminary Invalidity Contentions, dated Apr. 28, 2022 (PART 4 of 10—464 pages of 4594).

Jury Trial Demanded, Defendant Roku Inc.'S Preliminary Invalidity Contentions, dated Apr. 28, 2022 (PART 5 of 10—81 pages of 4594).

Jury Trial Demanded, Defendant Roku Inc.'S Preliminary Invalidity Contentions, dated Apr. 28, 2022 (PART 6 of 10—500 pages of 4594).

Jury Trial Demanded, Defendant Roku Inc.'S Preliminary Invalidity Contentions, dated Apr. 28, 2022 (PART 7 of 10—489 pages of 4594).

Jury Trial Demanded, Defendant Roku Inc.'S Preliminary Invalidity Contentions, dated Apr. 28, 2022 (PART 8 of 10—468 pages of 4594).

Jury Trial Demanded, Defendant Roku Inc.'S Preliminary Invalidity Contentions, dated Apr. 28, 2022 (PART 9 of 10—402 pages of 4594).

Jury Trial Demanded, Final Joint Claim Court, dated Nov. 4, 2015, INGEN-0081050, 26 pages.

Jury Trial Demanded, Plaintiff Ioengine, LLC's Answering Claim Construction Brief, dated Jan. 8, 2016, INGEN-0081102, 23 pages.

Jury Trial Demanded, Plaintiff Ioengine, LLC's Opposition to Interactive Media Corp.'S Renewed Motion for Judgment as a Matter of Law or, in the Alternative, for a New Trial, dated Mar. 15, 2017, INGEN-0081243, 25 pages.

Jury Trial Demanded, Public Version, Plaintiff Ioengine, LLC's Opening Claim Construction Brief, dated Dec. 4, 2015, INGEN-0081076, 26 pages.

Jury Trial Demanded, Public Version, Plaintiff Ioengine, LLC's Opposition to Imation Corp.'S Renewed Motion for Judgment as a Matter of Law or, in the Alternative, for a New Trial, dated Apr. 28, 2017, INGEN-0081125, 27 pages.

Katayama, Bob, "The dotpocket by Aurorisoft Inc.," dotPocket han-d-solutions.com review ("HAN-D Review") (2003), 3 pages.

Lloyd, Dennis, "Instant Expert: A Brief History of iPod," dated Jun. 26, 2004, INGEN-0082198, 20 pages.

M-System DiskOnKey (document states Aug. 17, 2001), 15 pages.

M-Systems Press Release re: DiskOnKey USB Flash Drives (Jan. 4, 2006), 3 pages.

M-Systems, Using MyKey (document states (c) 2003), 23 pages.

Maximum PC, "PC Pix! Megapixel Digital Cameras: We review 10 and pick the best," Magazine, dated Nov. 1998, INGEN-0081323, 7 pages.

McElhearn, Kirk, "15 years of iTunes: A look at Apple's media app and its influence on an industry," Macworld, News Analysis, https://www.macworld.com/article/3019878/15-years-of-itunes-a-

(56) References Cited

OTHER PUBLICATIONS look-at-apples-media-app-and-its-influence-on-an-industry.html, Jan. 9, 2016, INGEN-0082441, 17 pages.

Merriam-Webster's Collegiate Dictionary, "New Ways to Find the Words You Need Today," Eleventh Edition, 2003, INGEN-0083452, 3 pages.

Microsoft Computer Dictionary, Fifth Edition, 2002, pp. 362, 437, 458, 565, and 572.

Miranda Instant Messenger (2), "About Miranda IM", https://web.archive.org/web/20031228092924/http:/www.miranda-im.org, Copyright 2000-2003 Miranda IM, 2 pages.

Miranda Instant Messenger (3), "Screenshots", https://web.archive.org/web/20031228092924/http:/www.miranda-im.org, Copyright 2000-2003 Miranda IM, 2 pages.

Miranda Instant Messenger, https://web.archive.org/web/20031228092924/http:/www.miranda-im.org, Copyright 2000-2003 Miranda IM, 2 pages.

Newton, Harry, "The Authoritative Resource for Telecommunications, Networking, the Internet and Information Technology," Newton's Telecom Dictionary, 18th Updated and Expanded Edition, CMP Books, Feb. 2002, INGEN-0075835, 5 pages.

Notice of Allowance dated Jan. 26, 2021 for US App. No. 16/579,169 (pp. 1-11).

Notice of Allowance dated Jul. 16, 2021 for U.S. Appl. No. 17/241,038 (pp. 1-10).

Notice of Allowance dated Jun. 23, 2021 for U.S. Appl. No. 17/222,294 (pp. 1-10).

Notice of Allowance dated Mar. 23, 2021 for U.S. Appl. No. 16/516,244 (pp. 1-7).

Office Action (Non-Final Rejection) dated Sep. 21, 2022 for U.S. Appl. No. 17/409,761 (pp. 1-16).

Office Action (Notice of Allowance and Fees Due (PTOL-85)) dated Mar. 1, 2023 for U.S. Appl. No. 17/409,761 (pp. 1-7).

Office Action (Notice of Allowance and Fees Due (PTOL-85)) dated Mar. 15, 2023 for U.S. Appl. No. 17/409,761 (pp. 1-2).

Office Action dated Oct. 15, 2020 for U.S. Appl. No. 16/516,244 (pp. 1-25).

Oh, Chris, "M-Systems DiskOnKey," Review, Reprinted from SLCentral, dated Aug. 17, 2001, http://www.slcentral.com/reviews/hardware/storage/msystems/diskonkey, INGEN-0081330, 15 pages.

Order Construing the Terms of U.S. Pat. No. 8,539,047, dated Mar. 21, 2016, INGEN-0080281, 3 pages.

Patterson, et. al., "A Case for Redundant Arrays of Inexpensive Disks (RAID)," Computer Science Division, Department of Electrical Engineering and Computer Sciences, 1988, INGEN-0081031, 8 pages.

Pocket PC: Aurorisoft: The dotPocket, dotPocket googol.net review ("GOOGOL Review") (2004), 5 pages.

PRISMIQ Homepage (Nov. 24, 2002), 1 page.

PRISMIQ MediaPlayer Setup Guides, www.PRISMIQ.com, 2003, 88 pages, PRISMIQ_Media_Player_Guides_2003.

PRISMIQ, MediaPlayer/Recorder, Data Sheet, www.PRISMIQ.com, 2004, 2 pages, MediaPlayerRecorder_Datasheet.

Rebuttal Expert Report of Dr. Kevin Butler Regarding the Validity of U.S. Pat. No. 8,539,047, *Ioengine, LLC* v. *Interactive Media Corp.*, C.A. No. 14-1571 (D.Del.) and *Ioengine, LLC* v. *Imation Corp.*, C.A. No. 14-1572 (D.Del.) Jul. 22, 2016 (78 pages).

Inter Partes Review No. IPR2019-00906, Petition for Inter Partes Review for U.S. Pat. No. 9,059,969 Apr. 4, 2019), 95 pages.

Inter Partes Review No. IPR2019-00906, Petition for Inter Partes Review for U.S. Pat. No. 9,059,969, dated Apr. 4, 2019, INGEN-0083104, 95 pages.

Inter Partes Review No. IPR2019-00906: Denial Decision, Oct. 29, 2019 (33 pages).

Inter Partes Review No. IPR2019-00907, Petition for Iinter Partes Review for U.S. Pat. No. 9,059,969 Apr. 4, 2019), 99 pages.

Inter Partes Review No. IPR2019-00907, Petition for Inter Partes Review for U.S. Pat. No. 9,059,969, dated Apr. 4, 2019, INGEN-0083202, 99 pages.

Inter Partes Review No. IPR2019-00907: Denial Decision, Oct. 3, 2019 (25 pages).

Inter Partes Review No. IPR2019-00929, Declaration of James T. Geier for U.S. Pat. No. 9,774,703, dated Apr. 5, 2019, INGEN-0085056, 91 pages.

Inter Partes Review No. IPR2019-00929, Petition for Inter Partes Review for U.S. Pat. No. 9,774,703 dated Apr. 5, 2019, INGEN-0083301, 72 pages.

Inter Partes Review No. IPR2019-00929: Final Written Decision, Sep. 21, 2020 (106 pages).

Inter Partes Review No. IPR2019-00930, Petition for Inter Partes Review for U.S. Pat. No. 9,774,703, dated Apr. 8, 2019, INGEN-0085509, 95 pages.

Inter Partes Review No. IPR2019-00930: Denial Decision, Oct. 29, 2019 (42 pages).

Inter Partes Review No. IPR2019-00931, Petition for Iinter Partes Review for U.S. Pat. No. 9,774,703 Apr. 8, 2019), 102 pages.

Inter Partes Review No. IPR2019-00931: Denial Decision, Oct. 29, 2019 (40 pages).

Inter Partes Review No. IPR2019-XXXXX, Declaration of James T. Geier for U.S. Pat. No. 9,059,969, dated Feb. 28, 2019, INGEN-0077682, 86 pages.

Inter Partes Review No. IPR2022-01257, Denying Inter Partes Review for U.S. Pat. No. 10,447,819 B2 (Feb. 7, 2023) (21 pages).

Inter Partes Review No. IPR2022-01257, Petition for Inter Partes Review for U.S. Pat. No. 10,447,819, dated Jul. 7, 2022, Roku Petition IPR2022-01257 (Part 2 of 5—369 pages of 1871).

Inter Partes Review No. IPR2022-01257, Petition for Inter Partes Review for U.S. Pat. No. 10,447,819, dated Jul. 7, 2022, Roku Petition IPR2022-01257 (Part 5 of 5—316 pages of 1871).

Inter Partes Review No. IPR2022-01257, Petition for Inter Partes Reviewey for U.S. Pat. No. 10,447,819, dated Jul. 7, 2022, Roku Petition IPR2022-01257 (Part 4 of 5—354 pages of 1871).

Inter Partes Review No. IPR2022-01257, Petition for Inter Partes Reviewy for U.S. Pat. No. 10,447,819, dated Jul. 7, 2022, Roku Petition IPR2022-01257 (Part 3 of 5—458 pages of 1871).

Inter Partes Review No. IPR2022-01258, Denying Inter Partes Review for U.S. Pat. No. 10,447,819 B2 (Feb. 7, 2023) (18 pages).

Inter Partes Review No. IPR2022-01258, Petition for Inter Partes Review for U.S. Pat. No. 10,447,819, dated Jul. 7, 2022, Roku Petition IPR2022-01258 (Part 1 of 3—700 pages of 2102).

Inter Partes Review No. IPR2022-01258, Petition for Inter Partes Reviewey for U.S. Pat. No. 10,447,819, dated Jul. 7, 2022, Roku Petition IPR2022-01258 (Part 2 of 3—701 pages of 2102).

Inter Partes Review No. IPR2022-01258, Petition for Inter Partes Reviewey for U.S. Pat. No. 10,447,819, dated Jul. 7, 2022, Roku Petition IPR2022-01258 (Part 3 of 3—701 pages of 2102).

Inter Partes Review No. IPR2022-01551, Petition for Inter Partes Review for U.S. Pat. No. 10,972,584, dated Sep. 19, 2022, Roku Petition IPR2022-01551 (Part 1 of 6—514 pages of 1767).

Inter Partes Review No. IPR2022-01551, Petition for Inter Partes Review for U.S. Pat. No. 10,972,584, dated Sep. 19, 2022, Roku Petition IPR2022-01551 (Part 2 of 6—525 pages of 1767).

Inter Partes Review No. IPR2022-01551, Petition for Inter Partes Review for U.S. Pat. No. 10,972,584, dated Sep. 19, 2022, Roku Petition IPR2022-01551 (Part 3 of 6—389 pages of 1767).

Inter Partes Review No. IPR2022-01551, Petition for Inter Partes Review for U.S. Pat. No. 10,972,584, dated Sep. 19, 2022, Roku Petition IPR2022-01551 (Part 4 of 6—205 pages of 1767).

Inter Partes Review No. IPR2022-01551, Petition for Inter Partes Review for U.S. Pat. No. 10,972,584, dated Sep. 19, 2022, Roku Petition IPR2022-01551 (Part 5 of 6—97 pages of 1767).

Inter Partes Review No. IPR2022-01551, Petition for Inter Partes Review for U.S. Pat. No. 10,972,584, dated Sep. 19, 2022, Roku Petition IPR2022-01551 (Part 6 of 6—37 pages of 1767).

Inter Partes Review No. IPR2022-01552, Petition for Inter Partes Review for U.S. Pat. No. 10,972,584, dated Sep. 19, 2022, Roku Petition IPR2022-01552 (Part 1 of 6—472 pages of 1815).

Inter Partes Review No. IPR2022-01552, Petition for Inter Partes Review for U.S. Pat. No. 10,972,584, dated Sep. 19, 2022, Roku Petition IPR2022-01552 (Part 2 of 6—582 pages of 1815).

(56) References Cited

OTHER PUBLICATIONS

Inter Partes Review No. IPR2022-01552, Petition for Inter Partes Review for U.S. Pat. No. 10,972,584, dated Sep. 19, 2022, Roku Petition IPR2022-01552 (Part 3 of 6—354 pages of 1815).
Inter Partes Review No. IPR2022-01552, Petition for Inter Partes Review for U.S. Pat. No. 10,972,584, dated Sep. 19, 2022, Roku Petition IPR2022-01552 (Part 4 of 6—261 pages of 1815).
Inter Partes Review No. IPR2022-01552, Petition for Inter Partes Review for U.S. Pat. No. 10,972,584, dated Sep. 19, 2022, Roku Petition IPR2022-01552 (Part 5 of 6—99 pages of 1815).
Inter Partes Review No. IPR2022-01552, Petition for Inter Partes Review for U.S. Pat. No. 10,972,584, dated Sep. 19, 2022, Roku Petition IPR2022-01552 (Part 6 of 6—47 pages of 1815).
Inter Partes Review No. IPR2022-01553, Petition for Inter Partes Review for U.S. Pat. No. 10,972,584, dated Sep. 19, 2022, Roku Petition IPR2022-01553 (Part 1 of 5—686 pages of 2191).
Inter Partes Review No. IPR2022-01553, Petition for Inter Partes Review for U.S. Pat. No. 10,972,584, dated Sep. 19, 2022, Roku Petition IPR2022-01553 (Part 2 of 5—393 pages of 2191).
Inter Partes Review No. IPR2022-01553, Petition for Inter Partes Review for U.S. Pat. No. 10,972,584, dated Sep. 19, 2022, Roku Petition IPR2022-01553 (Part 3 of 5—878 pages of 2191).
Inter Partes Review No. IPR2022-01553, Petition for Inter Partes Review for U.S. Pat. No. 10,972,584, dated Sep. 19, 2022, Roku Petition IPR2022-01553 (Part 4 of 5—100 pages of 2191).
Inter Partes Review No. IPR2022-01553, Petition for Inter Partes Review for U.S. Pat. No. 10,972,584, dated Sep. 19, 2022, Roku Petition IPR2022-01553 (Part 5 of 5—134 pages of 2191).
Inter Partes Review No. IPR2022-01554, Petition for Inter Partes Review for U.S. Pat. No. 10,972,584, dated Sep. 19, 2022, Roku Petition IPR2022-01554 (Part 1 of 5—665 pages of 2229).
Inter Partes Review No. IPR2022-01554, Petition for Inter Partes Review for U.S. Pat. No. 10,972,584, dated Sep. 19, 2022, Roku Petition IPR2022-01554 (Part 2 of 5—403 pages of 2229).
Inter Partes Review No. IPR2022-01554, Petition for Inter Partes Review for U.S. Pat. No. 10,972,584, dated Sep. 19, 2022, Roku Petition IPR2022-01554 (Part 3 of 5—918 pages of 2229).
Inter Partes Review No. IPR2022-01554, Petition for Inter Partes Review for U.S. Pat. No. 10,972,584, dated Sep. 19, 2022, Roku Petition IPR2022-01554 (Part 4 of 5—98 pages of 2229).
Inter Partes Review No. IPR2022-01554, Petition for Inter Partes Review for U.S. Pat. No. 10,972,584, dated Sep. 19, 2022, Roku Petition IPR2022-01554 (Part 5 of 5—145 pages of 2229).
Inter Partes Review No. not assigned, Petition for Inter Partes Review for U.S. Pat. No. 9,059,969, dated Mar. 25, 2019, INGEN-0077563, 79 pages.
Inter Partes Review No. not assigned, Power of Attorney From Petitioner for U.S. Pat. No. 9,774,703, dated Apr. 5, 2019, INGEN-0083373, 3 pages.
Introducing RoomLink, Network Media Receiver, PCNA-MR10 ("Specification Sheet"), Sony Electronics Inc., 2003, 2 bages.
IPod User's Guide (2002), 38 pages.
IPod, User's Guide, 2002, Apple Computer, Inc., www.apple.com, INGEN-0082236, 38 pages.
Ripley, et al., "Content Protection in the Digital Home," Intel Technology Journal, Interoperable Home Infrastructure, vol. 06, Issue 04, Published Nov. 15, 2002, http://developer.intel.com/technology/itj/index.htm, 10 pages, Content Protection in the Digital Home - Ripley.
Russell, Gabe, "Dealing with DRM—Understanding DRM and How to Produce Protected Content," TECHTALK, Brightcove Inc., dated Jul. 17, 2018, INGEN-0082190, 8 pages.
Savage, Marcia, "RSA SecurID Gets Smart," CRN, dated Jan. 11, 2002, www.crn.com/news/security/18837256/rsa-securid-gets-smart.htm, INGEN-0081322, 1 page.
Savage, RSA SecurID Gets Smart (document states Jan. 11, 2002), 1 page.
Scott Spanbauer, "Mighty Mini Media", www.pcworld.com, May 2002, pp. 14-17.
Secure Electronic Commerce, INGEN-0078177, 81 pages. Undated, received Apr. 18, 2023.
Silicon Image, PanelLink A/V The Digital Solution for HDTV ("White Paper"), 12 pages, published year 2000.
Smith, Ernie, "The Incredibly Technical History of Digital Rights Management," Motherboard, VICE, Oct. 19, 2017, 3:00 pm, INGEN-0082304, 10 pages.
Soft Object Technologies Inc., Pocket Controller—Enterprise V4.00 (2003), 2 pages.
Software accompanying the Fuji FinePix6800 Zoom to be loaded onto a PC or Mac (2000), 1 page.
Tabor, How to Secure Your Wireless 802.11 Network (document states (c) 2003), 10 pages.
U.S. Pat 9,059,969 Challenged Claim Listing, *PayPal v. IOENGINE*, 6 pages, received Apr. 18, 2023.
U.S. Pat. 8,539,047 Claim Listing, INGEN-0081454, 6 pages, received Apr. 18, 2023.
U.S. Pat. 9,774,703 Challenged Claim Listing, INGEN-0086366, 12 pages, received Apr. 18, 2023.
U.S. Pat. No. 8,539,047 vs. PayPal Chip Card Reader, Exhibit A, INGEN-0081163, 80 pages, received Apr. 18, 2023.
U.S. Pat. No. 9,059,969 vs. PayPal Chip Card Reader, Exhibit E, INGEN-0082994, 104 pages, received Apr. 18, 2023.
U.S. Pat. No. 9,774,703 vs. The PayPal Chip Card Reader, Exhibit I, INGEN-0086266, 100 pages, received Apr. 18, 2023.
U.S. Appl. No. 10/807,731, filed Mar. 23, 2004, First Inventor: Scott McNulty, 406 pages, INGEN-0075965.
U.S. Appl. No. 12/950,321, filed Nov. 19, 2010, First Inventor: Scott McNulty, 348 pages, INGEN-0076400.
U.S. Appl. No. 12/950,321, filed Nov. 19, 2010. First Inventor: Scott McNulty, 349 pages, INGEN-0080674.
U.S. Appl. No. 13/960,514, filed Aug. 6, 2013, First Inventor: Scott McNulty, 251 pages, INGEN-0084269.
U.S. Appl. No. 13/960,514, filed Aug. 6, 2013, First Inventor: Scott McNulty, 253 pages, INGEN-0082741.
U.S. Appl. No. 14/721,540, filed May 26, 2015, First Inventor: Scott McNulty, 356 pages, INGEN-0085910.
Verdict Form, dated Feb. 17, 2017, INGEN-0081039, 11 pages.
Verdict Form, dated Jan. 13, 2017, INGEN-0081152, 11 pages.
Weiser, Mark, "The Computer for the 21st Century," reprinted from Sep. 1991 issue, INGEN-0081023, 8 pages.
Wikipedia, "iPod," last edited Mar. 27, 2019, INGEN-0082218, 17 pages.
Wikipedia, "iTunes Store," last edited Mar. 29, 2019, INGEN-0082287, 17 pages.
Wikipedia, "iTunes," last edited Apr. 2, 2019, INGEN-0082277, 10 pages.
"Editor's Choice," American Photo, May/Jun. 2001, 2 pages.
"FujiFilm FinePix 6900 Zoom, Nikon Coolpix 885," Digital Cameras, Reviews, PC Magazine, Editor's Choice, www.pcmag.com, 2001, INGEN-0078258, 4 pages.
"Information technology—identification cards—health care identification cards & 333 other titles," Titles in document V3458D972, Copyright Catalog, printed Mar. 22, 2019, https://cocatalog.loc.gov/cgi-bin/doctitles.cgi?V3458D972, INGEN-0081535, 17 pages.
"M-Systems Celebrates Five Years of DiskOnKey (R) USB Flash Drives with the Introduction of a New Whopping 8 Gigabyte Density," Business Wire, dated Jan. 4, 2006, 2006 International CES, 3 p. PP0016492.
"No Pirates Allowed," Prototype, Poptronics Magazine vol. 1, No. 12, Dec. 2000, 1 page.
"Part 2: Dimensions and location of the contacts," Information technology—Identification cards—Integrated circuit(s) cards with contacts-, ISO/IEC 7816-2, International Standard, American National Standards Institute, First Edition dated Mar. 1, 1999, INGEN-0081460, 10 pages.
"Specification of the Bluetooth System," Specification vol. 2, Wireless connections made easy, Profiles, dated Dec. 1, 1999, http://www.bluetooth.com, INGEN-0081345, 60 pages.
"The Sil 168 PanelLink Transmitter," Product Sheet, Silicon Image, 2000, 2 pages.
"Universal Serial Bus Specification," Revision 2.0, Apr. 27, 2000, INGEN-0078320, 222 pages.

(56) References Cited

OTHER PUBLICATIONS

ActivCard Authentication Tokens (document states May 31, 2002), 12 pages.
ActiveKey Brochure (document states (c) 2001), 2 pages.
Activkey, "Portable USB Digital Identity Device," ActivCard, Inc., Telecommunications & Security Systems Limited, 2001, www.activcard.com, 2 pages, PP0006188.
Affidavit of Christopher Butler, dated Dec. 18, 2018, INGEN-0081552, 19 pages.
Aladdin Annual Report (2001), 50 pages.
Aladdin Knowledge Systems Ltd, Annual Report 2001, 50 pages, PP0006438.
Apple iPod as depicted in photos produced at INGEN-0082235, available for inspection at the offices of counsel for Ingenico, and believed to be described in entry 36, 1 page, received Apr. 18, 2023.
Apple iPod, image, INGEN-0082235, 1 page. Undated, received Apr. 18, 2023.
Aurorisoft dotPocket 2.1 Review, reviewed Jan. 27, 2004, 48 pages.
Aurorisoft Case Studies (2003).
Bray, et al, "Bluetooth 1.1: Connect Without Cables," Second Edition, Prentice Hall PTR, www.phptr.com, Dec. 2001, INGEN-0075926, 24 pages.
Case Nos. IPR2019-00844; IPR2019-00845; IPR2019-00846; IPR2019-00847, Declaration of Dr. Clifford Neuman for U.S. Pat. No. 8,539,047, dated Mar. 27, 2019, INGEN-0079872, 250 pages.
Case Nos. IPR2019-00906; IPR2019-00907, Declaration of Dr. Clifford Neuman for U.S. Pat. No. 9,059,696, dated Apr. 3, 2019, INGEN-0082495, 246 pages.
Case Nos. IPR2019-00930; IPR2019-00931, Declaration of Dr. Clifford Neuman for U.S. Pat. No. 9,774,703, dated Apr. 8, 2019, INGEN-0085641, 269 pages.
Claim Construction Order by US District Court for the District of Delaware, Civil Action Nos. 18-452, -826 (Jun. 25, 2021).
Claims 55-129 for U.S. Pat. No. 9,774,703, INGEN-0085339, 148 pages, received Apr. 18, 2023.
Clayton, Jade, "Mcgraw-Hill Illustrated TELECOM Dictionary," Second Edition, 2000, INGEN-0083455, 3 pages.
Complaint for Declatory Judgment of Noninfringement, filed Jun. 1, 2018, , INGEN-0077523, 40 pages.
Complaint for Declatory Judgment of Noninfringement, filed Jun. 1, 2018, Claims for U.S. Patent No. 9,774,703, INGEN-0079730, 18 pages.
Complaint for Declatory Judgment of Noninfringement, filed Jun. 1, 2018, INGEN-0077419, 104 pages.
Complaint for Declatory Judgment of Noninfringement, filed Jun. 1, 2018, INGEN-0079604, 126 pages.
Complaint for Declatory Judgment of Noninfringement, filed Jun. 1, 2018, INGEN-0084912, 144 pages.
Costello, Sam, "How to Update the iPod Operating System Using iTunes," Lifewire, Updated Sep. 14, 2018, INGEN-0082314, 3 pages.
Costello, Sam, "What Is Digital Rights Management? DRM Explained," Lifewire, Updated Mar. 1, 2019, INGEN-0082438, 3 pages.
Curriculum Vitae of B. Clifford Neuman, Jan. 2019, INGEN-0080122, 19 pages.
Curriculum Vitae of James T. Geier, INGEN-0085499, 10 pages, received Apr. 18, 2023.
D-Link DSM-320 Wireless Media Player Manual v.1.5, 2002, 115 pages.
Day 1 of Jury Trial on Feb. 13, 2017, Transcript, INGEN-0080358, 316 pages.
Declaration of Martin L. Knott Regarding Authentication and Public Accessibility of Publication, dated Dec. 18, 2018, INGEN-0081314, 8 pages.
Defendant Interactive Media Corp. d/b/a Kanguru Solutions Initial Invalidity Contentions to Plaintiff IOENGINE, dated Jul. 14, 2015, 255 pages.
Defendant Paypal Holdings, Inc's First Supplemental Invalidity Contentions in *Ioengine, LLC* v. *Paypal Holdings, Inc.*, C.A. No. 18-452 (WCB) (D. Del.) (Apr. 17, 2019), 3 pages.

Defendant Paypal Holdings, Inc's Initial Invalidity Contentions in *Ioengine, LLC* v. *Paypal Holdings, Inc.*, C.A. No. 18-452 (WCB) (D. Del.) (Apr. 5, 2019).
Digital Camera Reviews, American Photo (May 2001), 2 pages.
Digital Camera Reviews, PC Magazine (Nov. 27, 2001), 4 pages.
DotPocket FAQ ("FAQ") (2004), 3 pages.
DotPocket home page ("dotpocket.com home page") (2003), Aurorisoft Inc., 1 page.
EN-Counter 4000, Retail and restaurant system, Ingenico, INGEN-0082008, 4 pages. Undated, received Apr. 18, 2023.
EToken Reference Guide (document states Aug. 2003), 94 pages.
Expert Report by Vijay Madiselli, Ph.D., *Ioengine, LLC* v. *Interactive Media Corp.*, C.A. No. 14-1571 (D.Del.) and *Ioengine, LLC* v. *Imation Corp.*, C.A. No. 14-1572 (D.Del.) Jul. 1, 2016 (141 pages).
Ford, et al, Building the Infrastructure for Digital Signatures & Encryption, Secure Electronic Commerce, Prentice Hall PTR, 1997, INGEN-0078084, 93 pages.
Ford, et al, Building the Infrastructure for Digital Signatures & Encryption, Secure Electronic Commerce, Prentice Hall PTR, 1997, INGEN-0085165, 174 pages.
Ford, Warwick et al., Secure Electronic Commerce, Prentice-Hall, Inc., 1997 (93 pages).
Freedman, Alan, "The Complete Illustrated Dictionary," Ninth Edition, The Computer Glossary, www.amacombooks.org, 2001, INGEN-0083449, 3 pages. (c) 1981-2001.
Fuji FinePix6800 Zoom, or FinePix6800Z as depicted in photos produced at INGEN-0073381 and available for Inspection at the offices of counsel for Ingenico, and believed to be described in at least reference 9, 29, 30, 31, 1 page received Apr. 18, 2023.
FujiFilm Digital Camera FinePix 6800Zoom 4800Zoom Brochure (c) 2001, 3 pages.
FujiFilm Digital Camera FinePix 6800Zoom, Design by F. A. Porsche, INGEN-0073381 Undated, received Apr. 18, 2023.
FujiFilm Digital Camera FinePix 6800Zoom, Quickstart Guide, INGEN-0073382, 1 page. Undated, received Apr. 18, 2023.
FujiFilm Digital Camera FinePix6800Zoom Owner's Manual (likely 2001), 67 pages.
FUJIFILM FinePix 6800Zoom Owner's Manual, INGEN-0077926, 92 pages. Undated.
FUJIFILM FinePixViewer User's Guide, FUJI Photo Film Co., Ltd., INGEN-0078018, 58 pages. Undated.
FujiFilm Software Quick Start Guide ("on sale" date of 2001 alleged in '879 Petition, pp. 10-11).
Fujifilm Software Quick Start Guide, 50 pages, received Apr. 18, 2023.
FUJIFILM Software Quick Start Guide, Brochure, Fuji Photo Film Co., Ltd., INGEN-0077800, 45 pages. Undated.
FujiFilm Software Quick Start Guide, Fuji Photo Film Co., LTD., INGEN-0078270, 50 pages. Undated.
Gosling, et al, "The Java Language Environment," A White Paper, Sun Microsystems Computer Company, Oct. 1995, INGEN-0075840, 86 pages.
Grotta, Sally Wiener, "4 to 6 Megapixels", PC Magazine, Nov. 27, 2001, 4 pages.
Harris, Mark, "The History of the iTunes Store," Lifewire, Updated Dec. 5, 2018, INGEN-0082274, 3 pages.
Hart, Russell, "PIXELS . . . Hot Technology, More Speed, Higher Resolution, Sleek Design, Plus Nikon's New Digital SLR.," Editor's Choice, INGEN-0078268, 2 pages. Undated.
Helal, Sumi, "Pervasive Java, Part II," Standards, Tools, & Best Practices, http://computer.org/pervasive, IEEE, 2002, INGEN-0075960, 5 pages.
High-bandwidth Digital Content Protection System, Revision 1.0, dated Feb. 17, 2000, 59 pages.
High-Definition Multimedia Interface Specification, Informational Version 1.0, dated Sep. 4, 2003, http://www.HDMI.org, 51 pages.
HomeRF, "Interference Immunit of 2.4 GHz Wireless LANs," Brochure, www.homerf.org, 2001, INGEN-0075950, 10 pages.
How to use the dotPocket (2004) Error, 1 page.
Key 1000 Series Collateral (document states (c) 2003), 2 pages.
Key Product Brief (document states Apr. 24, 2001), 7 pages.

(56) References Cited

OTHER PUBLICATIONS

Imation's Initial Invalidity Contentions, dated Jul. 14, 2015, 248 pages.
Ingenico 3010 User's Guide, Secure transaction and payment solutions, www.ingenico.com, INGEN-0081832, 16 pages, received Apr. 18, 2023.
Ingenico 3010, Installation Guide, 2004, INGEN-0081880, 2 pages.
Ingenico 6500, User's Guide, 2004, downloaded from www.Manualslib.com, INGEN-0081882, 126 pages. (C) 2004.
Ingenico's First Amended Initial Invalidity Contentions in *Ingenico Inc.* v. *Ioengine, LLC*, C.A. No. 18-826 (WCB) (D. Del.) (Apr. 12, 2019), 57 pages.
Inner Partes Review No. not assigned, Declaration of Paul Widener for U.S. Pat. No. 9,059,969, dated Feb. 11, 2019, INGEN-0077845, 81 pages.
Inter Partes Review No. IPR2022-01257, Petition for Inter Partes Reviewy for U.S. Pat. No. 10,447,819, dated Jul. 7, 2022, Roku Petition IPR2022-01257 (Part 1 of 5—374 pages of 1871).
Inter Partes Review No. IPR2019-00416: Denial of Reconsideration, Sep. 10, 2020 (12 pages).
Inter Partes Review No. IPR2019-00416: Final Written Decision, Jul. 13, 2020 (87 pages).
Inter Partes Review No. IPR2019-00416: Institution of Inter Partes Review, Jul. 15, 2019 (81 pages).
Inter Partes Review No. IPR2019-00416: Petition for Inter Partes Review Under 35 U.S.C. Section 311-319 AND 37 C.F.R. Section 42.100 et seq. filed with U.S. Pat. No. 8,539,047, issued Sep. 17, 2013, and entitled Apparatus, Method and System for a Tunneling Client Access Point, 73 pages.
Inter Partes Review No. IPR2019-00584, Decision Denying Institution of Inter Partes Review for U.S. Pat. No. 9,774,703 ;Aug. 9, 2019), 21 pages.
Inter Partes Review No. IPR2019-00584, Declaration of James T. Geier for U.S. Pat. No. 9,774,703, dated Jan. 17, 2019, INGEN-0075619, 113 pages.
Inter Partes Review No. IPR2019-00584, Notice of Filing Date Accorded to Petition and Time for Filing Patent Owner Preliminary Response for U.S. Pat. No. 9,774,703, mailed Feb. 12, 2019, INGEN-0075573, 5 pages.
Inter Partes Review No. IPR2019-00584, Patent Owner's Mandatory Notice for U.S. Pat. No. 9,774,703, dated Feb. 12, 2019, INGEN-0075581, 4 pages.
Inter Partes Review No. IPR2019-00584, Petition for Inter Partes Review for U.S. Pat. No. 9,774,703 ; Jan. 22, 2019), 75 pages.
Inter Partes Review No. IPR2019-00844, Petition for Inter Partes Review for U.S. Pat. No. 8,539,047, dated Mar. 29, 2019, INGEN-0079753, 88 pages.
Inter Partes Review No. IPR2019-00879, Petition for Inter Partes Review for U.S. Pat. No. 9,059,969 Mar. 25, 2019) ("1879 Petition"), 79 pages.
Inter Partes Review No. IPR2019-00879: Final Written Decision, Sep. 21, 2020 (87 pages).
Inter Partes Review No. IPR2019-00884, Petition for Inter Partes Review for U.S. Pat. No. 8,539,047, Mar. 29, 2019), 88 pages.
Inter Partes Review No. IPR2019-00884: Denial Decision, Oct. 3, 2019 (21 pages).
Inter Partes Review No. IPR2019-00885, Petition for Iinter Partes Review for U.S. Pat. No. 8,539,047, dated Mar. 29, 2019, 76 pages.
Inter Partes Review No. IPR2019-00885: Denial Decision, Oct. 3, 2019 (20 pages).
Inter Partes Review No. IPR2019-00886, Petition for Inter Partes Review for U.S. Pat. No. 8,539,047, dated Mar. 29, 2019, 94 pages.
Inter Partes Review No. IPR2019-00886: Denial Decision, Oct. 3, 2019 (21 pages).
Inter Partes Review No. IPR2019-00887, Petition for Inter Partes Review for U.S. Pat. No. 8,539,047; Mar. 29, 2019), 81 pages.
Inter Partes Review No. IPR2019-00887: Denial Decision, Oct. 3, 2019 (20 pages).
Memorandum Opinion and Order, *Ingenico Inc.,* v. *Ioengine, LLC*, Civil Action No. 18-826-WCB, Dec. 9, 2022 (52 pages).
Request for Ex Parte Reexamination of U.S. Pat. No. 10,972,584 (filed Sep. 2, 2023; Control No. 90015292) (3 parts).
Request for Ex Parte Reexamination of U.S. Pat. No. 10,447,819 (filed Sep. 2, 2023; Control No. 90015293) (6 parts).

* cited by examiner ns. # APPARATUS, METHOD AND SYSTEM FOR A TUNNELING CLIENT ACCESS POINT This application is a continuation of U.S. application Ser. No. 14/721,540, filed May 26, 2015, which is a continuation of U.S. application Ser. No. 13/960,514, filed Aug. 6, 2013, now U.S. Pat. No. 9,059,969, which is a continuation of U.S. application Ser. No. 12/950,321, filed Nov. 19, 2010, now U.S. Pat. No. 8,539,047, which is a continuation of U.S. application Ser. No. 10/807,731, filed on Mar. 23, 2003, now U.S. Pat. No. 7,861,006.

FIELD

The present invention is directed generally to an apparatus, method, and system of accessing data, and more particularly, to an apparatus, method and system to transmit and process data comprising a portable device in communication with a terminal and a communications network comprising a plurality of communications network nodes.

BACKGROUND

Portable Computing and Storage

Computing devices have been becoming smaller over time. Currently, some of the smallest computing devices are in the form of personal digital assistants (PDAs). Such devices usually come with a touch screen, an input stylus and/or mini keyboard, and battery source. These devices, typically, have storage capacities around 64 MB. Examples of these devices include Palm's Palm Pilot.

Information Technology Systems

Typically, users, which may be people and/or other systems, engage information technology systems (e.g., commonly computers) to facilitate information processing. In turn, computers employ processors to process information; such processors are often referred to as central processing units (CPU). A common form of processor is referred to as a microprocessor. A computer operating system, which, typically, is software executed by CPU on a computer, enables and facilitates users to access and operate computer information technology and resources. Common resources employed in information technology systems include: input and output mechanisms through which data may pass into and out of a computer; memory storage into which data may be saved; and processors by which information may be processed. Often information technology systems are used to collect data for later retrieval, analysis, and manipulation, commonly, which is facilitated through database software. Information technology systems provide interfaces that allow users to access and operate various system components.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interlaces are commonly called user interfaces. Graphical user interfaces (GUIs) such as the Apple Macintosh Operating System's Aqua, Microsoft's Windows XP, or Unix's X-Windows provide a baseline and means of accessing and displaying information, graphically, to users.

Networks

Networks are commonly thought to comprise of the interconnection and interoperation of clients, servers, and intermediary nodes in a graph topology. It should be noted that the term "server" as used herein refers generally to a computer, other device, software, or combination thereof that processes and responds to the requests of remote users across a communications network. Servers serve their information to requesting "clients." The term "client" as used herein refers generally to a computer, other device, software, or combination thereof that is capable of processing and making requests and obtaining and processing any responses from servers across a communications network. A computer, other device, software, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router". There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

SUMMARY

Although all of the aforementioned portable computing systems exist, no effective solution to securely access, execute, and process data is available in an extremely compact form. Currently, PDAs, which are considered among the smallest portable computing solution, are bulky, provide uncomfortably small user interfaces, and require too much power to maintain their data. Current PDA designs are complicated and cost a lot because they require great processing resources to provide custom user interfaces and operating systems. Further, current PDAs are generally limited in the amount of data they can store or access. No solution exists that allows users to employ traditional large user interfaces they are already comfortable with, provides greater portability, provides greater memory footprints, draws less power, and provides security for data on the device. As such, the disclosed tunneling client access point (TCAP) is very easy to use; at most it requires the user to simply plug the device into any existing and available desktop or laptop computer, through which, the TCAP can make use of a traditional user interface and input/output (I/O) peripherals, while the TCAP itself, otherwise, provides storage, execution, and/or processing resources. Thus, the TCAP requires no power source to maintain its data and allows for a highly portable "thumb" footprint. Also, by providing the equivalent of a plug-n-play virtual private network (VPN), the TCAP provides certain kinds of accessing of remote data in an easy and secure manner that was unavailable in the prior art.

In accordance with certain aspects of the disclosure, the above-identified problems of limited computing devices are overcome and a technical advance is achieved in the art of portable computing and data access. An exemplary tunneling client access point (TCAP) includes a method to dispose a portable storage device in communication with a terminal. The method includes providing the memory for access on the terminal, executing processing instructions from the memory on the terminal to access the terminal, communicating through a conduit, and processing the processing instructions.

In accordance with another embodiment, a portable tunneling storage processor is disclosed. The apparatus has a memory and a processor disposed in communication with the memory, and configured to issue a plurality of processing instructions stored in the memory. Also, the apparatus has a conduit for external communications disposed in communication with the processor, configured to issue a plurality of communication instructions as provided by the processor, configured to issue the communication instructions as signals to engage in communications with other devices having compatible conduits, and configured to receive signals issued from the compatible conduits.

BRIEF DESCRIPTION OF THE DRAWINGS

The accompanying drawings illustrate various non-limiting, example, inventive aspects in accordance with the present disclosure.

DETAILED DESCRIPTION

Topology

Figure 1:
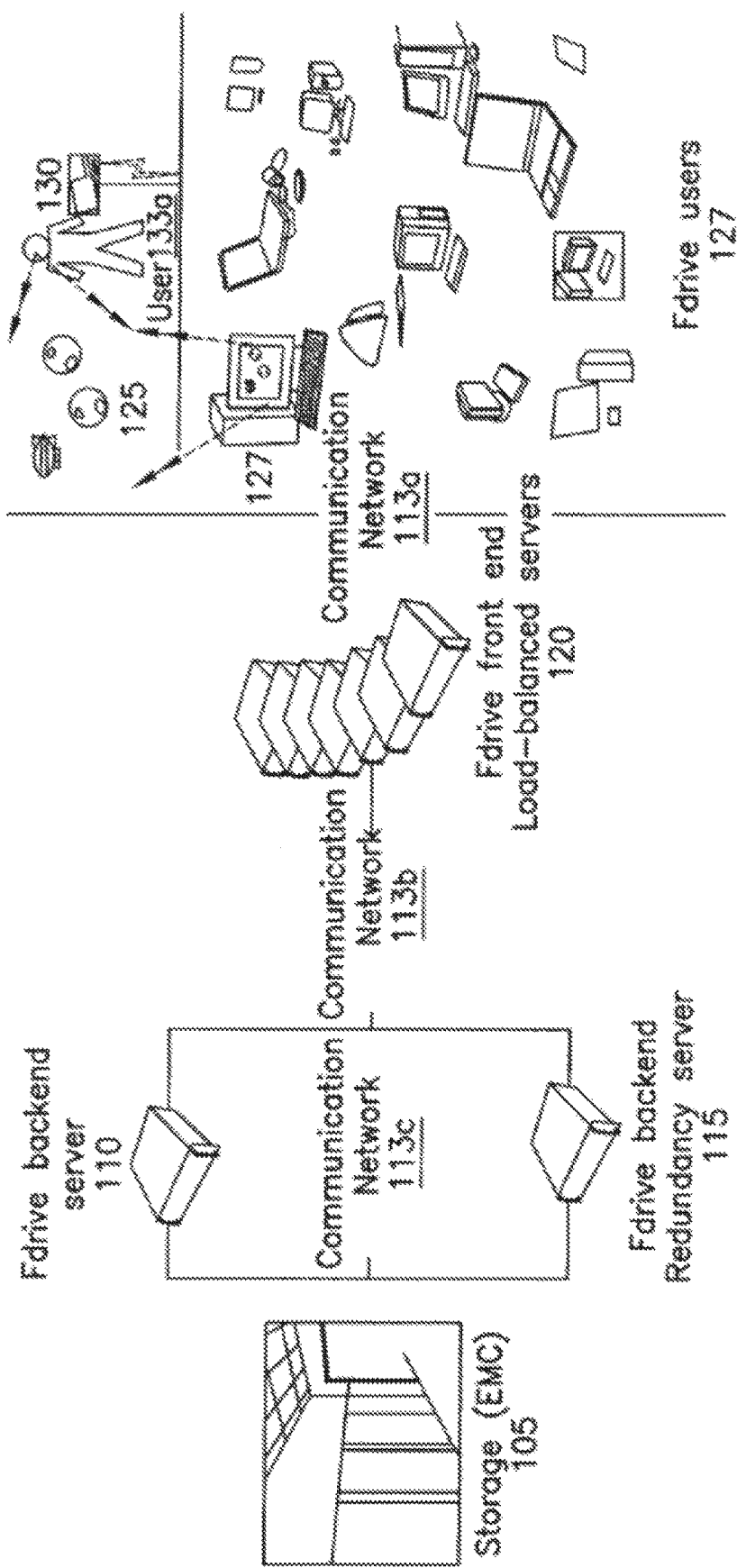
FIG. 1 is of a flow diagram illustrating embodiments of a tunneling client access point (TCAP)
Figure 9:
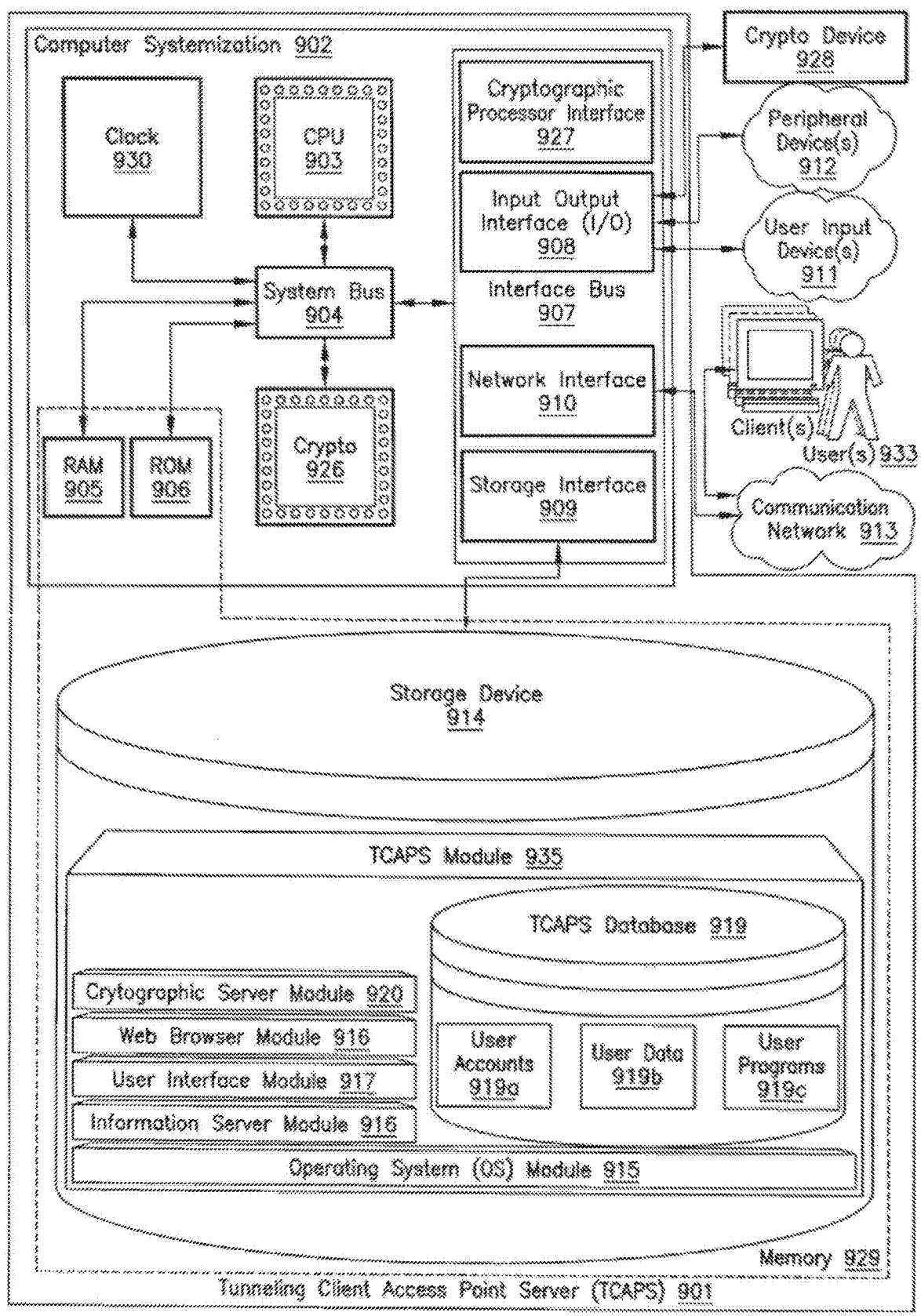
FIG. 9 is of a block diagram illustrating embodiments of a tunneling client access point server controller.

FIG. 1 illustrates embodiments for a topology between a tunneling client access point (TCAP) (see FIG. 10 for more details on the TCAP) and TCAP server (TCAPS) (see FIG. 9 for more details on the TCAPS). In this embodiment, a user 133a may plug-in a TCAP into any number of access terminals 127 located anywhere. Access terminals (ATs) may be any number of computing devices such as servers, workstations, desktop computers, laptops, portable digital assistants (PDAs), and/or the like. The type of AT used is not important other than the device should provide a compatible mechanism of engagement to the TCAP 130 and provide an operating environment for the user to engage the TCAP through the AT. In one embodiment, the TCAP provides a universal serial bus (USB) connector through which it may plug into an AT. In other embodiment, the TCAP may employ Bluetooth, WiFi and/or other wireless connectivity protocols to connect with ATs that are also so equipped. In one embodiment, the AT provides Java and/or Windows runtime environments, which allows the TCAP to interact with the input/output mechanisms of the AT. See FIG. 9 for more details and embodiments on the types of connections that may be employed by the TCAP. Once the TCAP has engaged with an AT, it can provide the user with access to its storage and processing facilities.

If the AT is connected to a communication network 113, the TCAP may then communicate beyond the AT. In one embodiment, the TCAP can provide extended storage and/or processing resources by engaging servers 110, 115, 120, which have access to and can provide extended storage 105 to the TCAP through the AT. In one embodiment, a single server and storage device may provide such TCAP server support. In another embodiment, server support is provided over a communications network, e.g., the internet, by an array of front-end load-balancing servers 120. These servers can provide access to storage facilities within the servers or to remote storage 105 across a communications network 113b, c (e.g., a local area network (LAN)). In such an embodiment, a backend server 110 may offload the front-end server with regard to data access to provide greater throughput. For purposes of load balancing and/or redundancy, a backup server 115 may be similarly situated to provide for access and backup in an efficient manner. In such an embodiment, the back-end servers may be connected to the front-end servers through a communications network 113b (e.g., wide area network (WAN)). The backend servers 110, 115 may be connected to the remote storage 105 through a communications network 113c as well (e.g., a high speed LAN, fiber-channel, and/or the like).

Thus, to the user 133a, the contents of the TCAP 130 appear on the AT as being contained on the TCAP 125 even though much of the contents may actually reside on the servers 115, 120 and/or the servers' storage facilities 105. In these ways, the TCAP "tunnels" data through an AT. The data may be provided through the AT's I/O for the user to observe without it actually residing on the AT. Also, the TCAP may tunnel data through an AT across a communications network to access remote servers without requiring its own more complicated set of peripherals and I/O.

TCAP and AT Interaction

Figure 2:
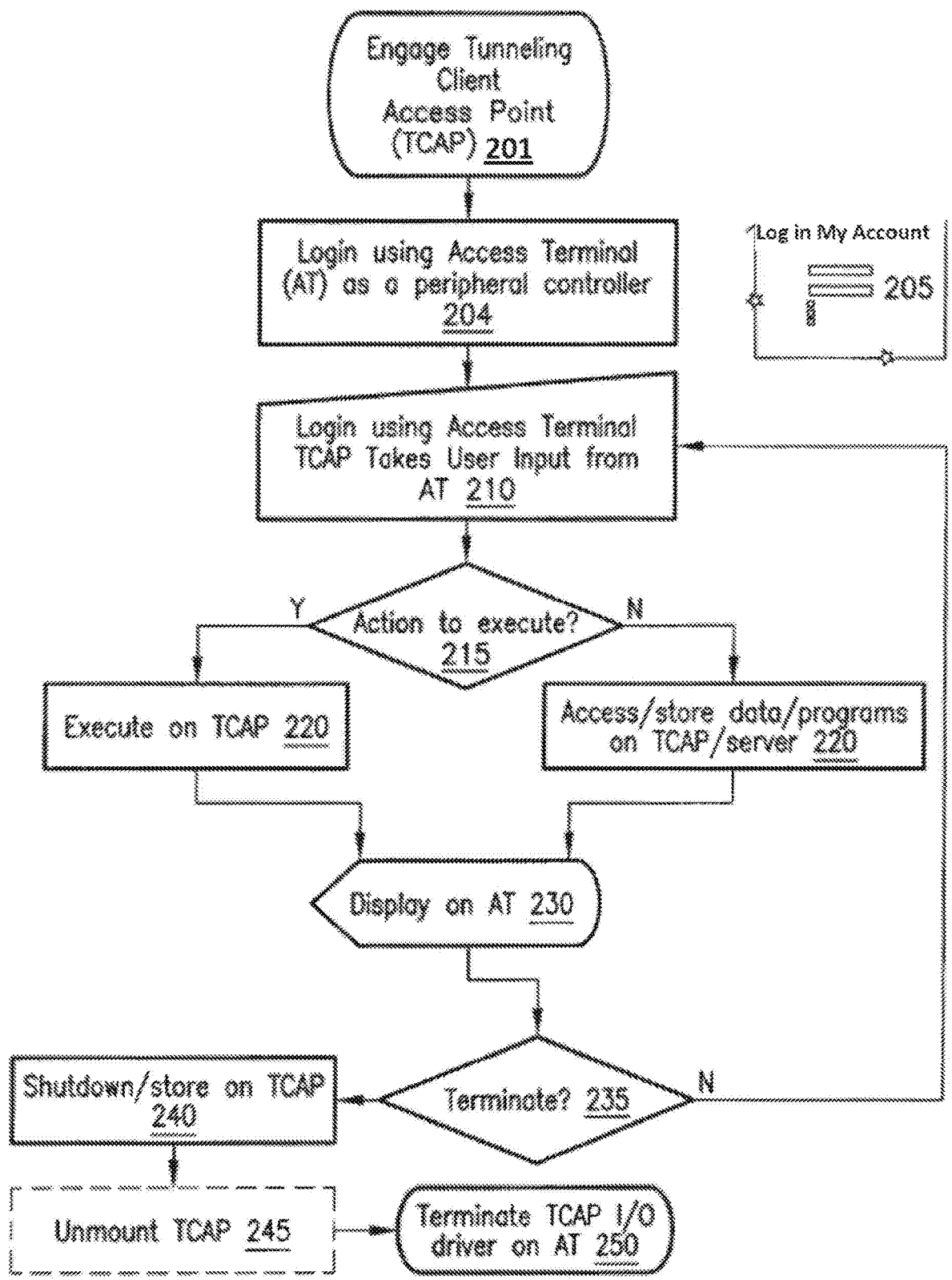
FIG. 2 is of a flow diagram illustrating embodiments of a system of tunneling client access point and access terminal interaction.

FIG. 2 illustrates embodiments for a system of tunneling client access point (TCAP) (see FIG. 10 for more details on the TCAP), and access terminal interaction. FIG. 2 provides an overview for TCAP and AT interaction and subsequent figures will provide greater detail on elements of the interaction. In this embodiment, a user engages the TCAP 201. For example, the user may plug the TCAP into an AT via the AT's USB port. Thereafter the user is presented with a login prompt 205 on the AT's display mechanism, e.g., on a video monitor. After a user successfully logs in (for example by providing a user name and password) 204, the TCAP can then accept user inputs from the AT and its peripherals (the TCAP can then also provide output to the user via the AT's peripherals).

The user may employ the AT's input peripherals as user input devices that control actions on the TCAP. Depending on the user's actions 215, the TCAP can be used by the AT as a storage device from which it can access and store data and programs 225. For example, if the user takes the action of opening a file from the TCAP's memory, e.g., by double clicking on an icon when the TCAP is mounted as a USB drive on the AT, then the AT may treat the TCAP as a memory device and retrieve information from the TCAP 225. If the user's action 215 is one that is directed at executing on the TCAP 215, then the AT will not be involved in any execution. For example, if the user drops an icon representing a graphics file onto a drag-and-drop location visually representing the TCAP, then the file may be copied to the TCAP where it will process and spool the file for sending the graphics file to be printed at a remote location. In such a case, all of the requirements to process and spool the file are handled by the TCAP's processor and the AT would only be used as a mechanism for user input and output and as a conduit through which the TCAP may send files.

Regardless of if there is an action 215 to execute on the TCAP 220 or to access or store data on the TCAP 225, the AT is used to display the status of any actions 230. At any time the user may select to terminate TCAP related facilities executing either on the AT, a backend server, on the TCAP itself, and/or the like 235. In one embodiment, the user may select a quit option that is displayed on the AT's screen. In another embodiment, the user may simply disengage the TCAP from the AT by severing the connection (e.g., turning power off, physically pulling the device off the AT, turning off wireless transmissions, and/or the like). It should be noted that such abrupt severing may result in the loss of data, file corruption, etc. if the TCAP has not saved data that is on the AT or on some remote server, however, if the TCAP is employing flash like memory, its contents should remain intact.

If there is no instruction signal to terminate the TCAP 235, execution will continue and the TCAP will continue to take and look for input from the user. Of course if the TCAP has been set to perform certain actions, those actions will continue to execute, and the TCAP may respond to remote servers when it is communicating with them through the AT. When the user issues a terminate signal 235, then the TCAP will shut down by saving any data to the TCAP that is in the AT's memory and then terminating any programs executing on both the AT and TCAP that were executed by and/or from the TCAP 240. If no activities are taking place on the TCAP and all the data is written back to the TCAP 240, then the TCAP may optionally unmount itself from the AT's filesystem 245. At this point, if there is a TCAP I/O driver executing on the AT, that driver may be terminated as triggered by the absence of the TCAP at a mount point 250. After the TCAP is unmounted and/or the TCAP I/O driver is terminated, it is safe to disengage the TCAP from the AT.

TCAP and AT Interaction

Figure 3:
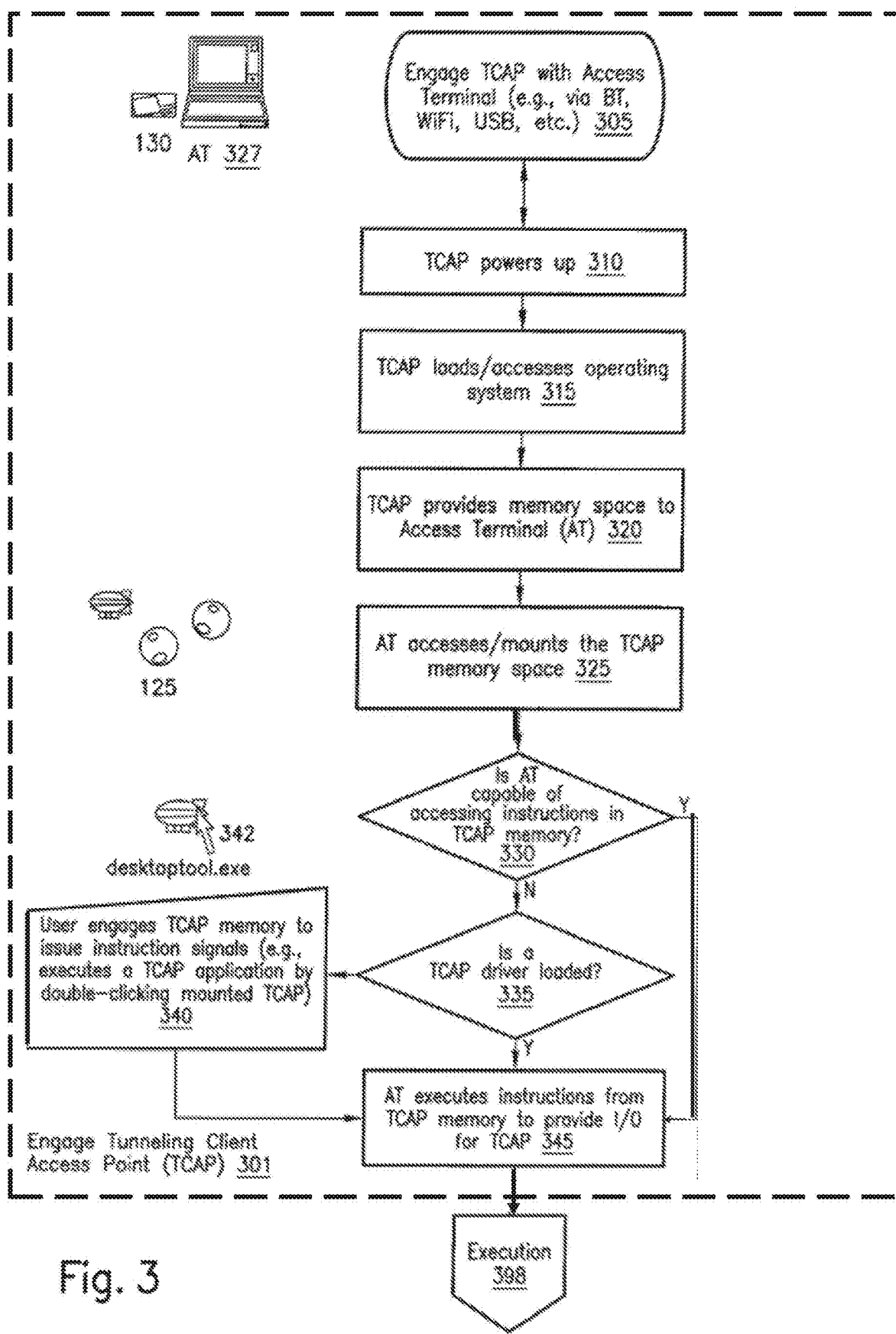
FIG. 3 is of a flow diagram illustrating embodiments of engaging the tunneling client access point to an access terminal interaction.

FIG. 3 illustrates embodiments engaging the tunneling client access point to an access terminal interaction. Examples of engaging the TCAP 301 with an AT were discussed above in FIG. 1 127, 130, 133a and FIG. 2 201. In one embodiment, the TCAP 130 is engaged with an access terminal 327, 305. As mentioned in FIG. 1, the TCAP is capable of engaging with ATs using a number of mechanisms. In one embodiment, the TCAP has a USB connector for plugging into an AT, which acts as a conduit for power and data transfer. In another embodiment, the TCAP may use Bluetooth to establish a wireless connection with a number of ATs. In another embodiment, the TCAP may employ WiFi. In yet another embodiment, the TCAP may employ multiple communications mechanisms. It should be noted, with some wireless mechanisms like Bluetooth and WiFi, simply coming into proximity with an AT that is configured for such wireless communication may result in the TCAP engaging with and establish a communications link with the AT. In one embodiment, the TCAP has a "connect" button that will allow such otherwise automatically engaging interactions take place only if the "connect" button is engaged by a user. Such an implementation may provide greater security for users (see FIG. 10 for more details on the TCAP).

After being engaged 305, the TCAP will then power on. In an embodiment requiring a direct connection, e.g., USB, simply plugging the TCAP into the AT provides power. In a wireless embodiment, the TCAP may be on in a lower powered state or otherwise turned on by engaging the connect button as discussed above. In such an embodiment, the TCAP can employ various on-board power sources (see FIG. 10 for more details on the TCAP). The TCAP then may load its own operating system 315. The operating system can provide for interaction with the AT. In one embodiment, a Java runtime is executed on the TCAP, and Java applets communicate with the AT through Java APIs. In another embodiment, a driver is loaded onto the AT, anti the on-TCAP Java operating system applets communicate to and through the AT via the driver running on the AT, wherein the driver provides an API through and to which messages may be sent.

After engaging with the AT, the TCAP can provide its memory space to the AT 320. In one embodiment, the TCAP's memory is mapped and mounted as a virtual disk drive 125 storage 325. In this manner, the TCAP may be accessed and manipulated as a standard storage device through the AT's operating system. Further, the TCAP and in some cases the AT can determine if the AT is capable of accessing program instructions stored in the TCAP's memory 330. In one embodiment, the AT's operating system looks to auto-run a specified file from any drive as it mounts. In such an embodiment, the TCAP's primary interface may be specified in such a boot sequence. For example, under windows, an autorun.inf file can specify the opening of a program from the TCAP by the AT; e.g., OPEN=TCAP.EXE.

Many operating systems are capable of at least accessing the TCAP as a USB memory drive 330 and mounting its contents as a drive, which usually becomes accessible in file browsing window 125. If the TCAP does not mount, the AT's operating system will usually generate an error informing the user of a mounting problem. If the AT is not capable of executing instruction from the TCAP, a determination is made if an appropriate driver is loaded on the AT to access the TCAP 335. In one embodiment, the TCAP can check to see if an API is running on the AT. For example, the TCAP provide an executable to be launched. e.g., as specified through autorun.inf, and can establish communications through its connection to the AT, e.g., employing TCP/IP communications over the USB port. In such an embodiment, the TCAP can ping the AT for the program, and if an acknowledgement is received, the TCAP has determined that proper drivers and APIs exist. If no such API exists, the TCAP may launch a driver installation program for the AT as through an autorun.inf. In an alternative embodiment, if nothing happens, a user may double click onto an installer program that is stored on the mounted TCAP 342, 340. It should be noted, that although the TCAP's memory space may be mounted, certain areas of the TCAP may be inaccessible until there is an authorization. For example, certain areas and content on the TCAP may be encrypted. It should be noted that any such access terminal modules that drive AT and TCAP interaction may be saved onto the TCAP by copying the module to a mounted TCAP. Nevertheless, if the AT is capable of accessing program instructions in TCAP memory 330, a TCAP driver is loaded on the AT 335, and/or the user engages a program in the TCAP memory 340, then the AT can execute program instructions from the TCAP's memory, which allows the TCAP to use the AT's I/O and allowing the user to interface with TCAP facilities 345. It should be noted that some ATs may not be able to mount the TCAP at all. In such an instance, the user may have to install the TCAP drivers by downloading them from a server on the Internet, loading them from a diskette or CD, and/or the like. Once the TCAP is engaged to the AT 301, execution may continue 398.

TCAP and AT Interaction

Figure 4:
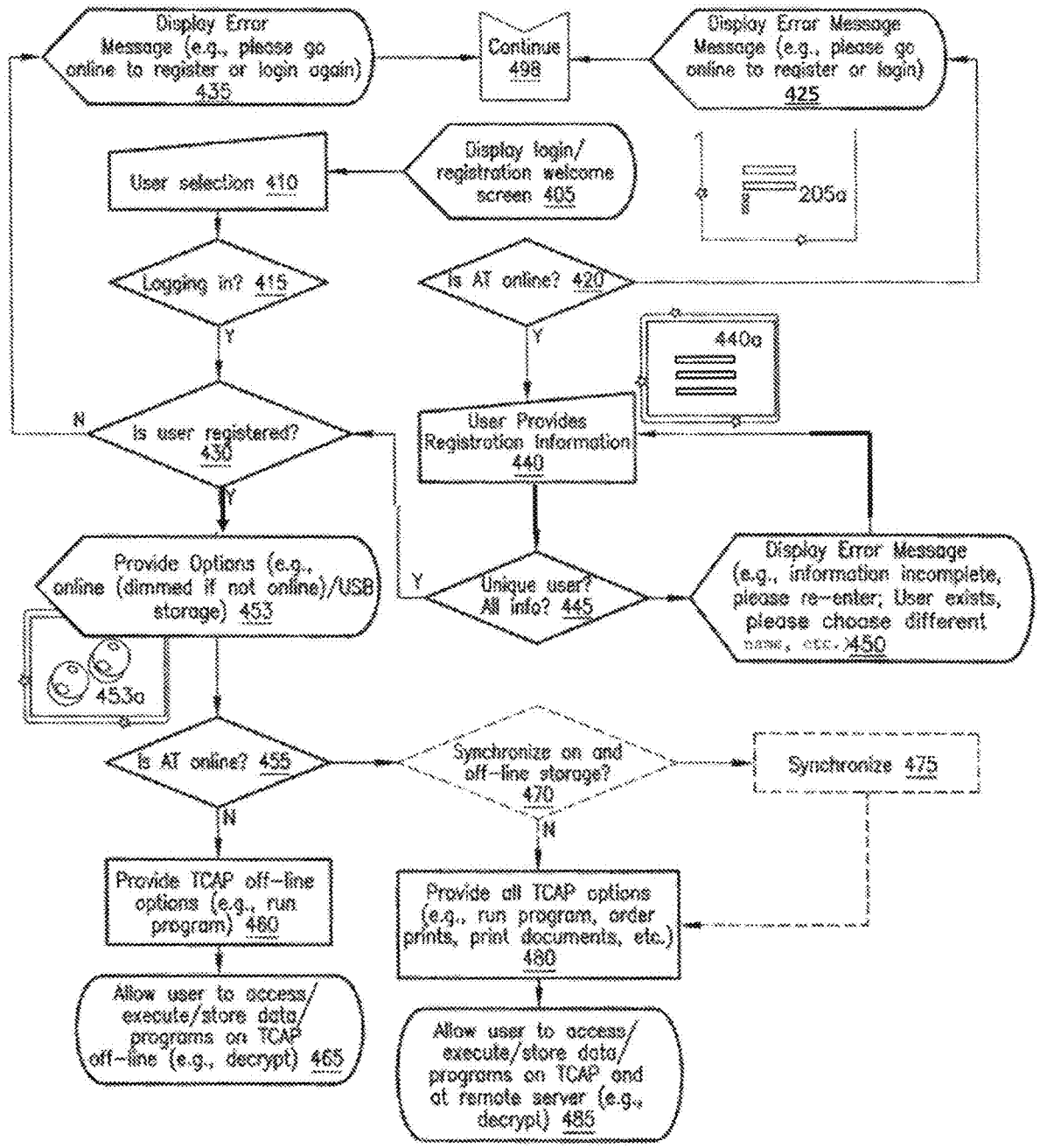
FIG. 4 is of a flow diagram illustrating embodiments of accessing the tunneling client access point and server through an access terminal.

FIG. 4 illustrates embodiments accessing the tunneling client access point and server through an access terminal. Upon engaging the TCAP to the AT as described in FIG. 3 301, 398, the user may then go on to access the TCAP and its services 498. It should be noted that users may access certain unprotected areas of the TCAP once it has been mounted, as described in FIG. 3. However, to more fully access the TCAP's facilities, the user may be prompted to either login and/or registration window 205*a* to access the TCAP and its services, which may be displayed on the AT 405. It is important to note that in one embodiment, the execution of the login and/or registration routines are handled by the TCAP's processor. In such an embodiment, the TCAP may run a small Web server providing login facilities, and connect to other Web based services through the AT's connection to the Internet. Further, the TCAP may employ a basic Web browsing core engine by which it may connect to Web services through the AT's connection to a communications network like the Internet. For purposes of security, in one embodiment, the TCAP may connect to a remote server by employing a secure connection, e.g., HTTPS, VPN, and/or the like.

Upon displaying a login window 405, e.g., 205*a*, the user may select to register to access the TCAP and its services, or they may simply log in by providing security verification. In one example, security authorization may be granted by simply providing a user and password as provided through a registration process. In another embodiment, authorization may be granted through biometric data. For example, the TCAP may integrate a fingerprint and/or heat sensor IC into its housing. Employing such a device, and simply by providing one's finger print by laying your finger to the TCAP's surface, would provide the login facility with authorization if the user's finger print matches one that was stored during the registration process.

If the user does not attempt to login 415, i.e., if the user wishes to register to use the TCAP and its services, then the TCAP can determine if the AT is online 420. This may be accomplished in a number of ways. In one embodiment, the TCAP itself may simply ping a given server and if acknowledgement of receipt is received, the TCAP is online. In another embodiment, the TCAP can query for online status by engaging the AT through the installed APIs. If the AT is not online, then the user may be presented with an error message 425 Thus, if a user does not have a login, and does not have the ability to register, then restricted areas of the TCAP will remain unavailable. Thereafter, flow can continue 498 and the user may have another opportunity to login and/or register. In one embodiment as a login integrity check, the TCAP keeps track of the number of failed attempts to login and/or register and may lock-out all further access if a specified number of failed attempts occurs. In one embodiment, the lockdown may be permanent by erasing all data on the TCAP. In another embodiment, the TCAP will disallow further attempts for a specified period of time.

If the user is attempting to register 415, and the AT is online 420, then the user map provide registration information 440 into a screen form 440*a*. Registration information fields may require a user's name, address, email address, credit card information, biometric information (e.g., requiring the user to touch a biometric fingerprint IC on the TCAP), and/or the like. The TCAP may determine if all the information was provided as required for registration and may query backend servers to determine if the user information is unique 445. If the user did not properly fill out the registration information or if another user is already registered, the TCAP can provided an error message to such effect. Also, both the TCAP and its back-end servers may make log entries tracking such failed attempts for purposes of defending against fraud and/or security breaches. The user may then modify the registration information 440 and again attempt to register. Similarly to the login integrity checks, the TCAP can lockout registration attempts if the user fails to register more than some specified number of times.

Upon providing proper registration information 445 or proper login authentication 415, the TCAP can query backend servers to see if the user is registered. In one embodiment, such verification may be achieved by sending a query to the servers to check its database for the authorization information and/or for duplicate registrations. The servers would then respond providing an acknowledgment of proper registration and authorization to access data on the backend servers. If the users are not registered on the backend servers 430, then the TCAP can provide an error message to the user for display on the AT to such effect 435. In an alternative embodiment, the registration information may be stored on the TCAP itself. In one embodiment, the registration would be maintained in encrypted form. Thus, the user's login information may be checked relative to the information the TCAP itself, and if there is a match, access may be granted, otherwise an error message will be displayed 435. The TCAP may then continue 498 to operate as if it were just engaged to the AT.

If the user is confirmed to be registered 430, then the TCAP may provide options for display 453, 453*a*. Depending on the context and purpose of a particular TCAP, the options may vary. For example, the a screen 453*a* may provide the user with the options to access data either online or offline. The user might simply click on a button and gain secure access to such data that may be decrypted by the TCAP. In one embodiment, the TCAP will determine if the AT is online 455. If this was already determined 420, this check 455 may be skipped.

If the AT is online 455, optionally, the TCAP determines if the user wishes to synchronize the contents of the TCAP with storage facilities at the backend server 470. In one embodiment, the user may designate that such synchronization is to always take place. If synchronization is specified 470, then the TCAP will provide and receive updated data to and from the backend servers, overwriting older data with updated versions of the data 475. If the AT is online 455 and/or after any synchronization 475, the TCAP may provide the user with all of its service options as authorized by the account and programs available on the TCAP and at the backend server 480. Once again, these facilities, programs, and/or services may vary greatly depending on the context and deployment requirements of the user. The options to be presented to the user from the TCAP or the TCAP services from the backend server, as displayed through the TCAP onto the AT's display 480, are myriad and some example embodiments are provided in FIGS. 5-8. Upon presenting the user with the options, the user is then able to access, execute, store data and programs on the TCAP and on the remote server 485. All areas of the TCAP and services are then open, including any encrypted data areas.

If the AT is not online 455, the TCAP may provide options for the user not including online services 460. In one embodiment, the online options that may be presented on the AT display will be dimmed and/or omitted to reflect the lack of accessibility. However, the user will be able to access, execute, store data and programs on the TCAP, including any encrypted data areas 465.

TCAP Facilities and Services

FIGS. 5-8 illustrate embodiments of facilities, programs, and/or services that the tunneling client access point and server may provide to the user as accessed through an AT. Any particular set of facilities may have a myriad of options. The options and the general nature of the facilities provided on any particular TCAP are dependant upon the requirements of a given set of users. For example, certain groups and/or agencies may require TCAPS to be targeted towards consumer photographs, and may employ TCAPs to further that end. Other groups may require high security facilities, and tailor the TCAPs accordingly. In various environments, an organization may wish to provide a secure infrastructure to all of its agents for securely accessing the organization's data from anywhere and such an organization could tailor the TCAPs contents to reflect and respond to its needs. By providing a generalized infrastructure on the TCAP backend servers and within the TCAP by using a generalized processor, the TCAPs may be deployed in numerous environments.

Figure 5:
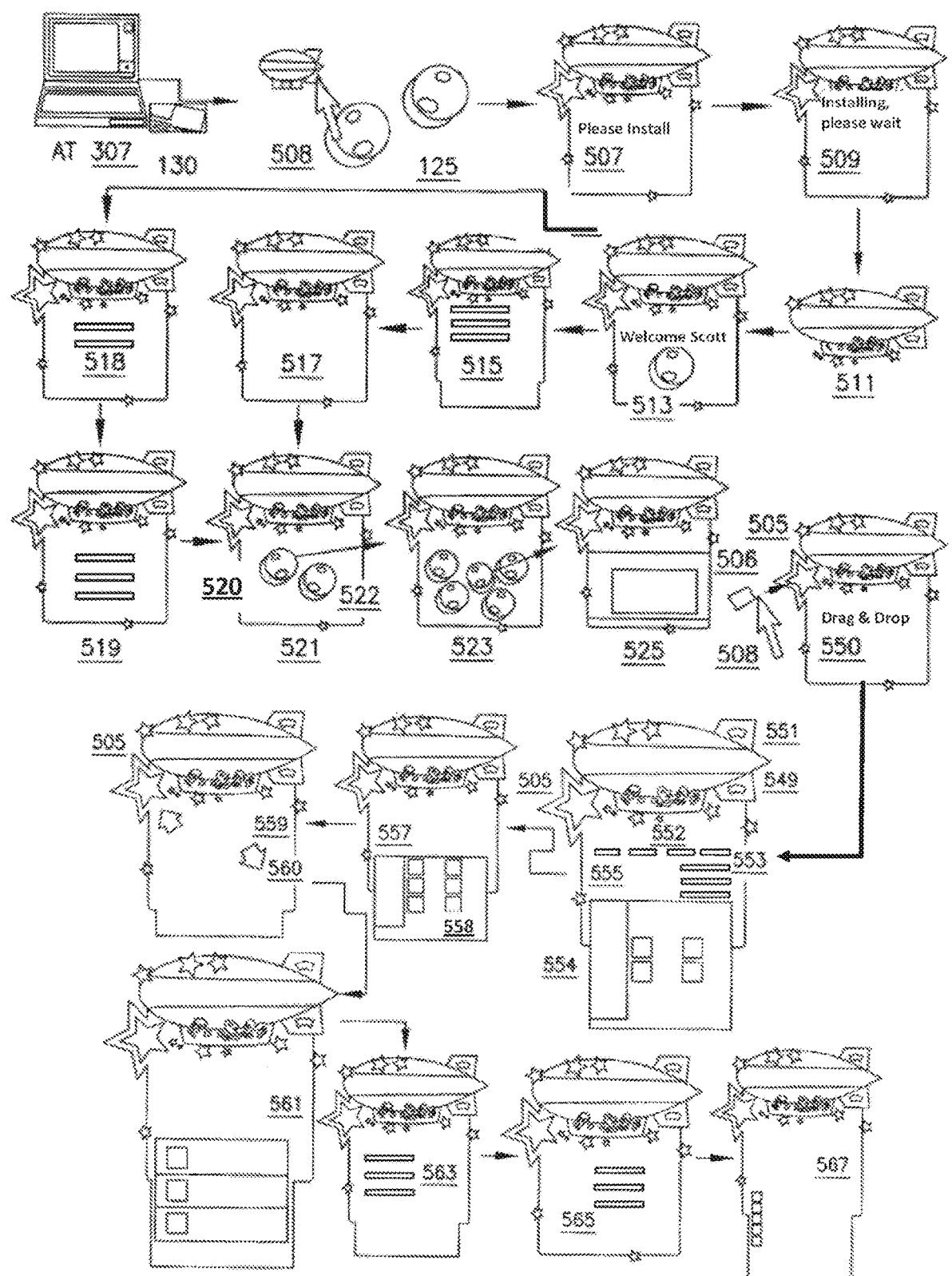
FIGS. 5-8 is of a flow diagram illustrating embodiments of facilities, programs, and/or services that the tunneling client access point and server may provide to the user as accessed through an access terminal.

In one particular embodiment as in FIG. 5, the TCAP provides facilities to access, process, and store email, files, music, photos and videos through the TCAP. Upon engaging 101 of FIG. 1 the TCAP 130 to an AT 307, the TCAP will mount and display through the AT's file browser window 125 of FIG. 1. As has already described, in the case where the AT has no TCAP driver software, the user may double click on the installer software stored on the TCAP 507. Doing so will launch the installer software from the TCAP's memory to execute on the AT, and the user may be presented with a window to confirm the desire to install the TCAP software onto the AT 507. Upon confirming the install 507, the software will install on the AT and the user will be asked to wait as they are apprised of the install progress 509.

Upon installation, the TCAP front-end software may execute and present the user with various options in various and fanciful interface formats 511, 460, 480 of FIG. 4. In one embodiment, these user interfaces and programs are Java applications that may execute on the AT and a present Java runtime. In an alternative embodiment, a small applet may run on the AT, but all other activities may execute on the TCAP's processor, which would use the AT display only as a display terminal. In the embodiment where the TCAP executes program instructions, the TCAP may be engaged to receive commands and execute by receiving a signal from the access terminal driver instructing it to execute certain program files or, alternatively, looking to default location and executing program instructions. In yet another embodiment, the TCAP may obtain updated interfaces and programs from a backend server for execution either on the TCAP itself and/or the AT; this may be done by synchronization with the backend server and checking for updates of specified files at the backend server. By engaging the user interface, perhaps by clicking on a button to open the TCAP facilities and services 511, the interface may further unfurl to present options to access said facilities and services 513. Here, the interface may reflect ownership of the TCAP by providing a welcome screen and showing some resources available to the user; for example, a button entitled "My Stuff" may serve as a mechanism to advance the user to a screen where they may access their personal data store. At this point the user may attempt to login to access their data by engaging an appropriate button, which will take them to a screen that will accept login information 519. Alternatively, the user may also register if it is their first time using the TCAP by selecting an appropriate button, which will advance the user to a registration screen 515 wherein the user may enter their name, address, credit card information, etc. Upon successfully providing registration information, the user may be prompted for response to further solicitations on a follow-up screen 517. For example, depending on the services offered for a particular TCAP, the user may be provided certain perks like 5 MB of free online storage on a backend server, free photographic prints, free email access, and/or the like 517.

After the user is prompted to login 518 and successfully provides proper login information 519, or after successfully registering 515 and having responded to any solicitations 517, the user may be provided with general options 521 to access data stored on the TCAP itself 522 or in their online account 520 maintained on a backend server. For example, if the user selects the option to access their online storage 520, they may be presented with more options to interact with email, files, music, photos and videos that are available online 523. Perhaps if the user wished to check their email, the user might select to interact with their email, and a screen allowing them to navigate through their email account(s) would be presented 525. Such online access to data may be facilitated through http protocols whereby the TCAP applications send and receive data through http commands across a communications network interacting with the backend servers and/or other servers Any received results may be parsed and imbedded in a GUI representation of a Java application. For example, the email facility may run as a Java applet 525 and may employ a POP mail protocol to pull data from a specified mail server to present to the user.

Similarly, many other facilities may be engaged by the user through the TCAP. In one embodiment, the user may drag 508 a file 506 onto a drag-and-drop zone 505 that is presented on the TCAP interface. Upon so doing, various drag-and-drop options may unfurl and present themselves to the user 550. It should be noted that the file may come from anywhere, i.e., from the AT, the TCAP, and/or otherwise. For example, upon dragging and dropping a graphics file, a user may be prompted with options to order prints, upload the file to an online storage space, save the file to the TCAP's memory space, cancel the action, and/or the like 550. If the user sends the file for storage, or otherwise wishes to see and manage their data, an interface allowing for such management may be presented 555. The interface may organize and allow access to general data, picture, and music formats 554, provide usage statistics (e.g., free space, capacity, used space, etc.) 553, provide actions to manipulate and organize the data 552, provide status on storage usage on the TCAP 551 and online 549, and/or the like.

Should the user engage a user interface element indicating the wish to manipulate their picture data 548, the TCAP interface will update to allow more specific interaction with the user's photos 557. In such a screen, the user may select serious stored pictures and then indicate a desire to order photo prints by engaging the appropriate user interface element 558. Should the user indicate their desire for prints 558, they will be presented with an updated interface allowing the specification of what graphics files they wish to have printed 559. In one embodiment, the users may drag-anddrop files into a drop zone, or otherwise engage file browsing mechanisms 560 that allow for the selection of desired files. Upon having identified the files for prints 559, a user may be presented with an interface allowing for the selection of print sizes and quantities 561. After making such specifications, the user may be required to provide shipping information 563 and information for payments 565. After providing the billing information to a backend server for processing and approval, the user may be presented with a confirmation interface allowing for editing of the order, providing confirmation of costs, and allowing for submission of a final order for the selected prints 567. Upon submitting the order, the TCAP will process the files for spooling to a backend server that will accept the order and files, which will be developed as prints and the user's account will be charged accordingly. In one embodiment, all of the above order and image processing operations occur and execute on the TCAP CPU. For example, the TCAP may employ various rendering technologies, e.g., ghostscript, to allow it to read and save PDFs and other media formats.

Figure 6:
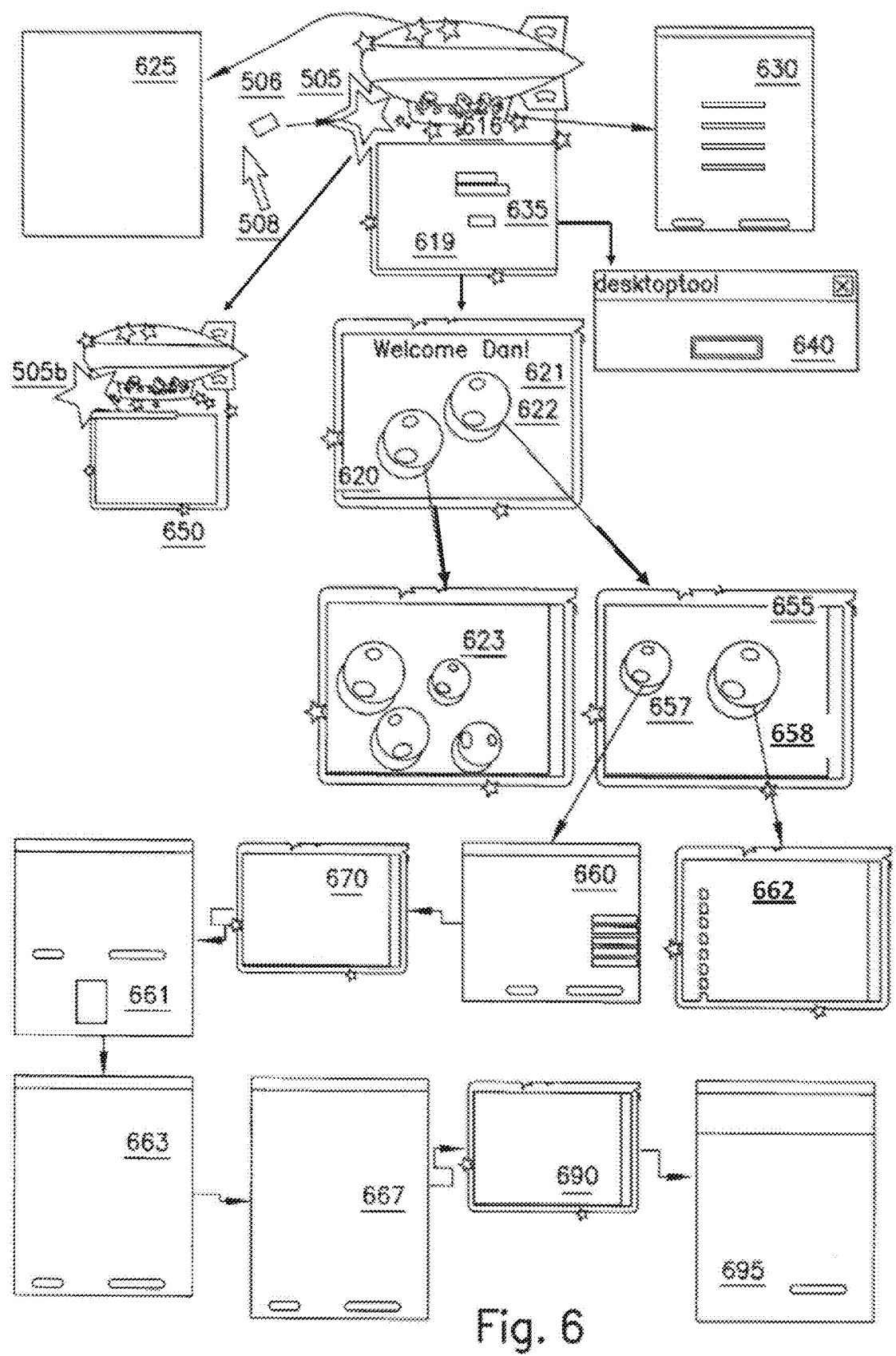

FIG. 6 goes on to illustrate embodiments and facets of the facilities of FIG. 5. The TCAP interface allows the user to perform various actions at any given moment. As has already been discussed in FIG. 5, the user may drag 508 a file 506 onto a drag and drop zone 505 so as to provide the file to the TCAP for further manipulation. As in 550 of FIG. 5, the user may be presented with various options subsequent to a drag-and-drop operation. Also, the TCAP interface may provide visual feedback that files have been dropped in the drop zone by highlighting the drop zone 505*b*. Should the user wish, they may close the TCAP interface by engaging a close option 633. Also, the ability to change and/or update their personal information may be accessed through the TCAP interface 616, which would provide a form allowing the user to update their registration information 630. In one embodiment, should the user forget their login information, they may request login help 635 and the TCAP will send their authorization information to the last known email address and inform the user of same 640. Also, the TCAP interface may provide help facilities that may be accessed at any time by simply engaging a help facility user interface element 617. So doing will provide the user with help screen information as to how to interact with the TCAP's facilities 625.

Upon providing proper login information 619 and logging-in 619, the user may be presented with a welcome screen with various options to access their data 621 as has already been discussed in FIG. 5, 521. By engaging a user interface element to access online storage 620, the user may be presented with various options to interact with online storage 623, 523 of FIG. 5. Should the user wish to interact with data on the TCAP itself, the user may indicate so by engaging the appropriate user interface option 622. So doing will provide the user with further options related to data stored on the TCAP 655. The user may engage an option to view the storage contents 658 and the TCAP interface will provide a listing of the contents 662, which may be manipulated through selection and drag-and-drop operations with the files.

In one embodiment, the user may order prints of photos 657 from files that are on the TCAP itself. As discussed in FIG. 5, the user may select files for which they desire prints 660. Here, the selected files will first be processed by the TCAP in preparation for sending to backend servers and tile manipulations 670. The user may specify various attributes regarding the prints they desire, e.g., the size, number, cropping, red-eye correction, visual effects, and/or the like 661. In one embodiment, such processing occurs on the TCAP processor, while in other embodiments such processing can take place on the AT or backend server. Once again, the user may provide a shipping address 663, and make a final review to place the order 667. Upon committing to the order 667, the processed tiles are uploaded to the backend servers that will use the files to generate prints 690. A confirmation screen may then be provided to the user with an order number and other relevant information 695.

Figure 7:
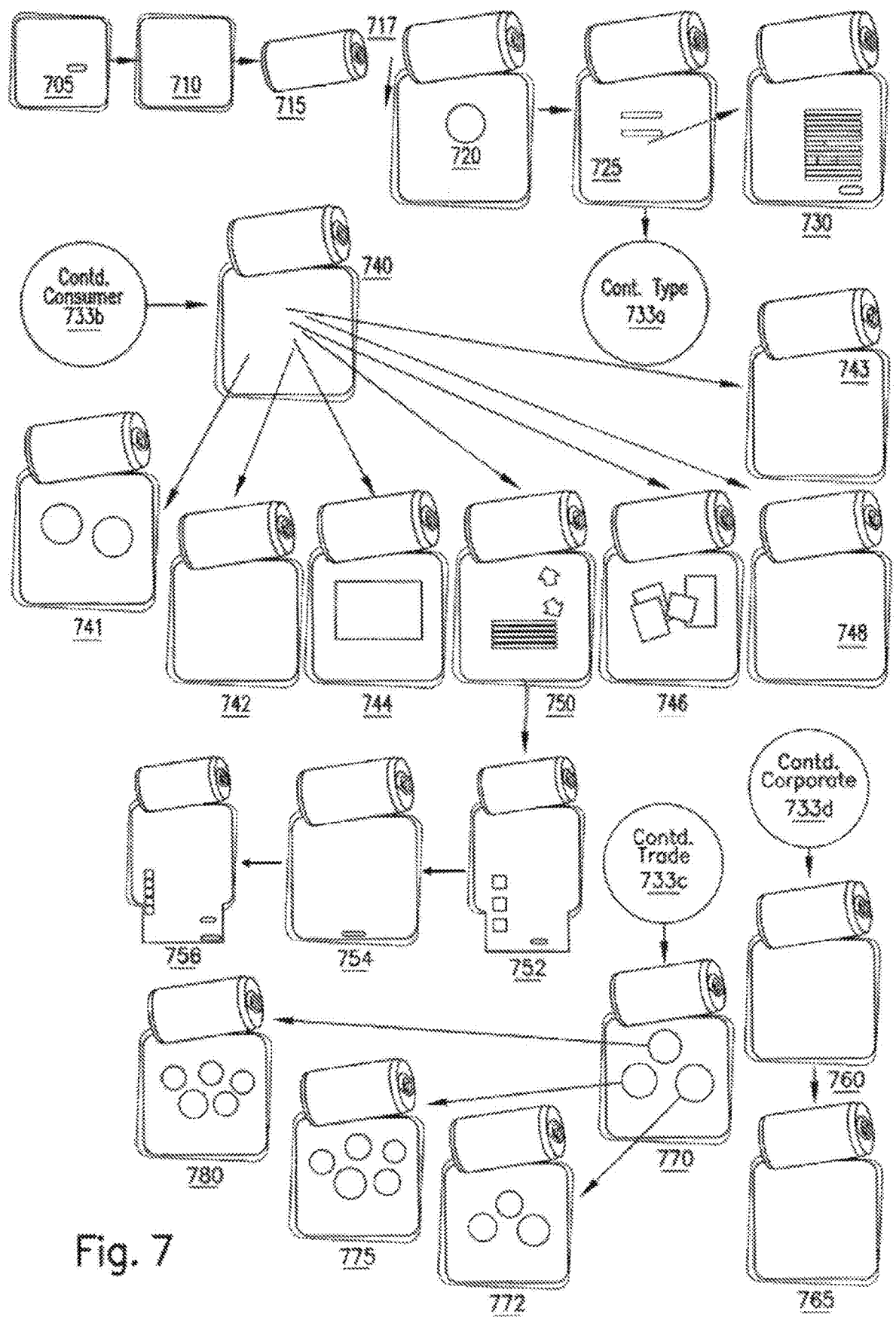

FIG. 7 goes on to illustrate embodiments and facets of the facilities of FIGS. 5-6 as may apply in different environments. As is demonstrated, the look and feel of the TCAP interface is highly malleable and can serve in many environments. FIG. 7 illustrates that even within a single organization, various environments might benefit from TCAPs and services tailored to serve such environments 733*b*-*d*. In this case TCAPs can serve in consumer 733*b*, industry trade 733*c*, corporate 733*d*, and/or the like environments.

As has already been discussed, initially in any of the environments, after engaging the TCAP to an AT, the user may be prompted to install the TCAP interlace 705 and informed of the installation procedure 710. The user may then be presented with the installed TCAP interface 715, which may be activated by engaging an interface element to unfurl the interface, e.g., in this case by opening the top to a can of soda 717. Opening the interface will present the user with various options as 720, as has already been discussed in FIGS. 5-6. Similarly the user may login 725 or make a selection to register for various TCAP services and provide the requisite information in the provided form 730. Upon registering and/or logging-in 725, various options may be presented based upon the configuration of the TCAP. For example, if the TCAP was configured and tailored for consumers, then upon logging in 725 the consumer user might be presented 733*a*-*b* with various consumer related options 740. Similarly, if the TCAP were tailored for 733*a*, *c* the trade industry or 733*a*, *d* the corporate environment, options specific to the trade industry 770 and corporate environment 760 may be presented.

In one embodiment, an organization wishing to provide TCAPs to consumers might provide options 740 for free music downloads 743, free Internet radio streaming 748, free news (e.g., provided through an RSS feed from a server) 766, free photo priming 750, free email 740, free coupons 742, free online storage 741, and/or the like. Users could further engage such services (e.g., clicking free music file links for downloading to the TCAP, by ordering prints 750, etc. For example, the user may select files on the TCAP 750, select the types of photos they would like to receive 752, specify a delivery address 754, confirm the order 756 all of which will result in the TCAP processing the files and uploading them to the backend servers for generation of prints (as has already been discussed in FIGS. 5-6).

In another embodiment, an organization wishing to provide TCAPs to a trade industry might provide options 770 for advertising 780, events 775, promotions 772, and/or the like. It is important to note that information regarding such options may be stored either on the TCAP or at a backend server. In one embodiment, such information may be constantly synchronized from the backend servers to the TCAPs. This would allow an organization to provide updates to the trade industry to all authorized TCAP "key holders." In such an embodiment, the user may be presented with various advertising related materials for the organization, e.g., print, television, outdoor, radio, web, and/or the like 780. With regard to events, the user may be presented with various related materials for the organization, e.g., trade shows, music regional, sponsorship. Web, and/or the like 775. With regard to promotions, the user may be presented with various related materials for the organization, e.g., rebates, coupons, premiums, and/or the like 772.

In another embodiment, an organization wishing to provide TCAPs to those in the corporate environment and might provide options relating to various corporate entities 760. Selecting any of the corporate entities 760 may provide the user with options to view various reports, presentations, and/or the like, e.g., annual reports, 10K reports, and/or the like 765. Similarly, the reports may reside on the TCAP and/or the corporate TCAP can act as a security key allowing the user to see the latest corporate related materials from a remote backend server.

Figure 8:
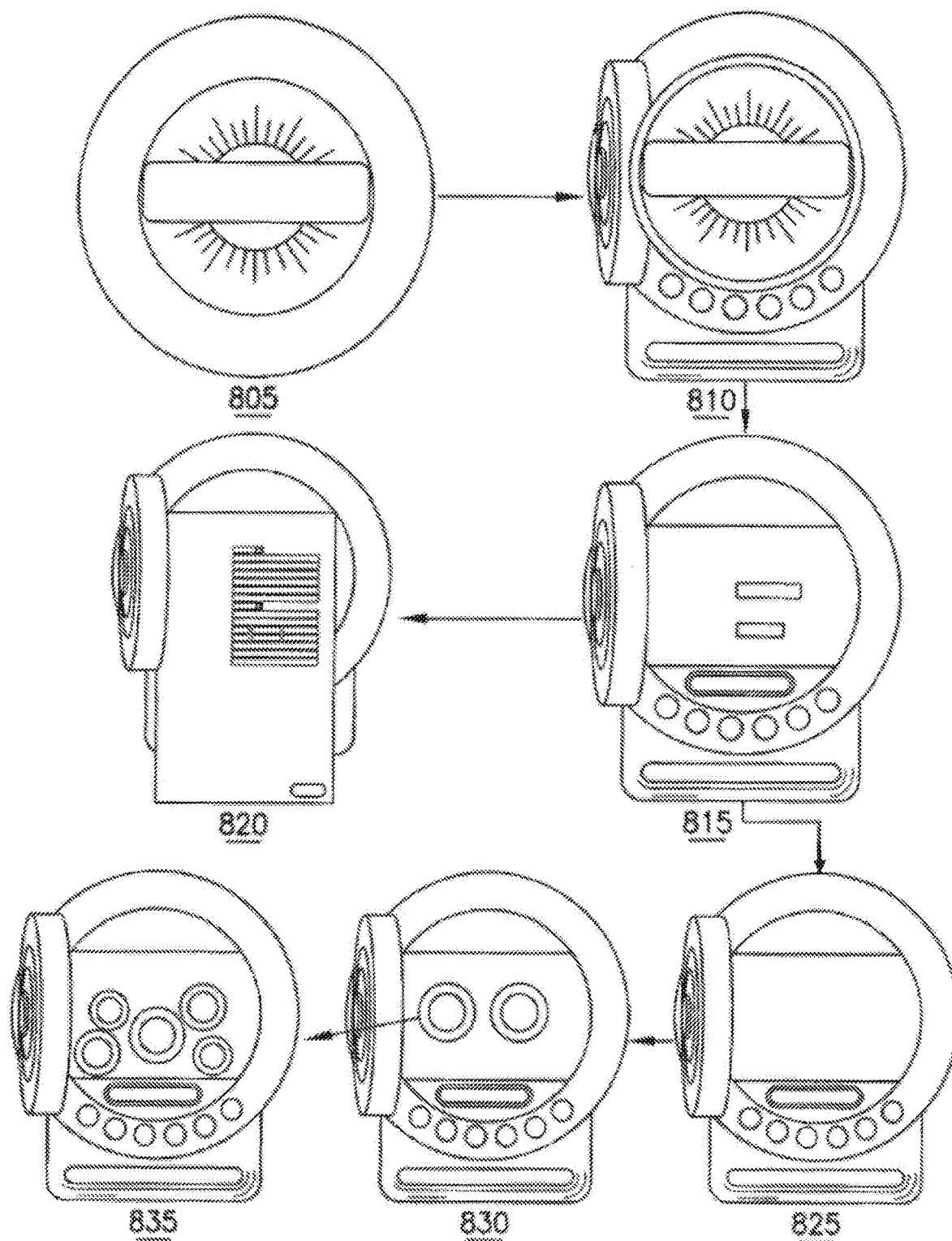

FIG. 8 goes on to illustrate embodiments and facets of the facilities of FIGS. 5-7 as may apply in different environments. FIG. 8 illustrates that TCAPs may serve to provide heightened security to any environment. As has been discussed in previous figures, users may engage the TCAP interface 805 to access various options 810. The TCAP interface is highly adaptable and various services may be presented within it. For example, a stock ticker may be provided as part of the interface in a financial setting 810. Any number of live data feeds may dynamically update on the face of the interface. Upon logging-in 815 or registering a new account 820, the user may be informed that communications that are taking place are secured 825. In one embodiment, various encryption formats may be used by the TCAP to send information securely to the backend servers. It is important to note that in such an embodiment, even if data moving out of the TCAP and across the AT were captured at the AT, such data would not be readable because the data was encrypted by the TCAP's processor. As such, the TCAP acts as a "key" and provides a plug-and-play VPN to users. Such functionality, heretofore, has been very difficult to set up and/or maintain. In this way, all communications, options presented and views of user data are made available only to the TCAP with the proper decryption key. In heightened security environments, display of TCAP data is provided on the screen only in bitmapped format straight to the video memory of the AT and, therefore, is riot stored anywhere else on the AT. This decreases the likelihood of capturing sensitive data. As such, the user may access their data on the TCAP and/or online 830 in a secure form whereby the user may navigate and interact with his/her data and various services 835 in a secure manner.

Tunneling Client Access Point Server Controller

FIG. 9 illustrates one embodiment incorporated into a tunneling client access point server (TCAPS) controller 901. In this embodiment, the TCAP controller 901 may serve to process, store, search, serve, identify, instruct, generate, match, and/or update data in conjunction with a TCAP (see FIG. 10 for more details on the TCAP). TCAPS act as backend servers to TCAPs, wherein TCAPS provide storage and/or processing resources to great and/or complex for the TCAP to service itself. In effect, the TCAPS transparently extend the capacity of a TCAP.

In one embodiment, the TCAPS controller 901 may be connected to and/or communicate with entities such as, but not limited to: one or more users from user input devices 911; peripheral devices 912; and/or a communications network 913. The TCAPS controller may even be connected to and/or communicate with a cryptographic processor device 928.

A TCAPS controller 901 may be based on common computer systems that may comprise, but are not limited to, components such as: a computer systemization 902 connected to memory 929.

Computer Systemization

A computer systemization 902 may comprise a clock 930, central processing unit (CPU) 903, a read only memory (ROM) 906, a random access memory (RAM) 905, and/or an interface bus 907, and most frequently, although not necessarily, are all interconnected and/or communicating through a system bus 904. Optionally, a cryptographic processor 926 may be connected to the system bus. The system clock typically has a crystal oscillator and provides a base signal. The clock is typically coupled to the system bus and various clock multipliers that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the cause of return and/or reply signal communications beyond the instant computer systemization to: communications networks, input devices, other computer systemizations; peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program modules for executing user and/or system-generated requests. The CPU may be a microprocessor such as AMD's Athlon, Duron and/or Opteron; IBM and/or Motorola's PowerPC; Intel's Celeron, Itanium, Pentium and/or Xeon; and/or the like processor(s). The CPU interacts with memory through signal passing through conductive conduits to execute stored program code according to conventional data processing techniques. Such signal passing facilitates communication within the TCAPS controller and beyond through various interfaces. Should processing requirements dictate a greater amount speed, mainframe and super computer architectures may similarly be employed.

Interface Adapters

Interface bus(ses) 907 may accept, connect, and/or communicate to a number of interface adapters, conventionally although not necessarily in the form of adapter cards, such as but not limited to: input output interfaces (I/O) 908, storage interfaces 909, network interfaces 910, and/or the like. Optionally, cryptographic processor interfaces 927 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)). Personal Computer Memory Card International Association (PCMCIA), and/or the like.

Storage interfaces 909 may accept, communicate, and/or connect to a number of storage devices such as, but not limited to: storage devices 914, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 910 may accept, communicate, and/or connect to a communications network 913. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN), a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 910 may be used to engage with various communications network types 913. For example, multiple network interfaces may be employed to allow for the communication over broadcast, multicast, and/or unicast networks. Input Output interfaces (I/O) 908 may accept, communicate, and/or connect to user input devices 911, peripheral devices 912, cryptographic processor devices 928, and/or the like. I/O may employ connection protocols such as, but not limited to: Apple Desktop Bus (ADB); Apple Desktop Connector (ADC); audio; analog, digital, monaural, RCA, stereo, and/or the like; IEEE 1394a-b; infrared; joystick; keyboard; midi; optical; PC AT; PS/2; parallel; radio; serial; USB; video interface; BNC, composite, digital, Digital Visual Interface (DVI), RCA, S-Video, VGA, and/or the like; wireless; and/or the like. A common output device is a video display, which typically comprises a Cathode Ray Tube (CRT) or Liquid Crystal Display (LCD) based monitor with an interface (e.g., DVI circuitry and cable) that accepts signals from a video interface. The video interface composites information generated by a computer systemization and generates video signals based on the composited information in a video memory frame. Typically, the video interface provides the composited video information through a video connection interface that accepts a video display interface (e.g., a DVI connector accepting a DVI display cable).

User input devices 911 may be card readers, dongles, finger print readers, gloves, graphics tablets, joysticks, keyboards, mouse (mice), trackballs, trackpads, retina readers, and/or the like.

Peripheral devices 912 may be connected anchor communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, visors, and/or the like.

It should be noted that although user input devices and peripheral devices may be employed, the TCAPS controller may be embodied as an embedded, dedicated, and/or headless device, wherein access would be provided over a network interface connection.

Cryptographic units such as, but not limited to, microcontrollers, processors 926, interfaces 927, and/or devices 928 may be attached, and/or communicate with the TCAPS controller. A MC68HC16 microcontroller, commonly manufactured by Motorola Inc., may be used for and/or within cryptographic units. Equivalent microcontrollers and/or processors may also be used. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Other commercially available specialized cryptographic processors include VLSI Technology's 33 MHz 6868 or Semaphore Communications' 40 MHz Roadrunner 184.

Memory

Generally, any mechanization and/or embodiment allowing a processor to affect the storage and/or retrieval of information is regarded as memory 929. However, memory is a fungible technology and resource, thus, any number of memory embodiments may be employed in lieu of or in concert with one another. It is to be understood that a TCAPS controller and/or a computer systemization may employ various forms of memory 929. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 929 will include ROM 906, RAM 905, and a storage device 914. A storage device 914 may be any conventional computer system storage. Storage devices may include a drum; a (fixed and/or removable) magnetic disk drive; a magneto-optical drive; an optical drive (i.e., CD ROM/RAM/Recordable (R), Rewritable (RW), DVD R/RW, etc.); and/or other devices of the like. Thus, a computer systemization generally requires and makes use of memory.

Module Collection

The memory 929 may contain a collection of program and/or database modules anchor data such as, but not limited to operating system module(s) 915 (operating system); information server module(s) 916 (information server); user interface module(s) 917 (user interface); Web browser module(s) 918 (Web browser); database(s) 919; cryptographic server module(s) 920 (cryptographic server); TCAPS module(s) 935; and/or the like (i.e., collectively a module collection). These modules may be stored and accessed from the storage devices and/or from storage devices accessible through an interface bus. Although non-conventional software modules such as those in the module collection, typically, are stored in a local storage device 914, they may also be loaded and/or stored in memory such as: peripheral devices, RAM, remote storage facilities through a communications network, ROM, various forms of memory, and/or the like.

Operating System

The operating system module 915 is executable program code facilitating the operation of a TCAPS controller. Typically, the operating system facilitates access of I/O, network interlaces, peripheral devices, storage devices, and/or the like. The operating system may be a highly fault tolerant, scalable, and secure system such as Apple Macintosh OS X (Server), AT&T Plan 9, Be OS, Linux, Unix, and/or the like operating systems. However, more limited and/or less secure operating systems also may be employed such as Apple Macintosh OS, Microsoft DOS, Palm OS, Windows 2000/2003/3.1/95/98/CE/Millenium/NT/XP (Server), and/or the like. An operating system may communicate to and/or with other modules in a module collection, including itself, anchor the like. Most frequently, the operating system communicates with other program modules, user interfaces, and/or the like. For example, the operating system may contain, communicate, generate, obtain, and/or provide program module, system, user, and/or data communications, requests, and/or responses. The operating system, once executed by the CPU, may enable the interaction with communications networks, data, I/O, peripheral devices, program modules, memory, user input devices, and/or the like. The operating system may provide communications protocols that allow the TCAPS controller to communicate with other entities through a communications network 913. Various communication protocols may be used by the TCAPS controller as a subcarrier transport mechanism for interaction, such as, but not limited to multicast, TCP/IP, UDP, unicast, and/or the like.

Information Server

An information server module 916 is stored program code that is executed by the CPU. The information server may be a conventional Internet information server such as, but not limited to Apache Software Foundation's Apache, Microsoft's Internet Information Server, and/or the. The information server may allow for the execution of program modules through facilities such as Active Server Page (ASP), ActiveX, (ANSI) (Objective-) C (++), Common Gateway Interface (CGI) scripts, Java, JavaScript, Practical Extraction Report Language (PERL), Python, WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), and/or the like. The information server provides results in the form of Web pages to Web browsers, and allows for the manipulated generation of the Web pages through interaction with other program modules. After a Domain Name System (DNS) resolution portion of an HTTP request is resolved to a particular information server, the information server resolves requests for information at specified locations on a TCAPS controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other modules in a module collection, including itself, and/or facilities of the like. Most frequently, the information server communicates with the TCAPS database 919, operating systems, other program modules, user interfaces, Web browsers, and/or the like.

Access to TCAPS database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the TCAP. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the TCAPS as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program module, system, user, and/or data communications, requests, and/or responses.

User Interface

A user interface module 917 is stored program code that is executed by the CPU. The user interface may be a conventional graphic user interface as provided by, with, and/or atop operating systems and/or operating environments such as Apple Macintosh OS, e.g., Aqua, Microsoft Windows (NT/XP), Unix X Windows (KDE, Gnome, and/or the like), and/or the like. The user interface may allow for the display, execution, interaction, manipulation, and/or operation of program modules and/or system facilities through textual and/or graphical facilities. The user interface provides a facility through which users may affect, interact, and/or operate a computer system. A user interface may communicate to and/or with other modules in a module collection, including itself, and/or facilities of the like. Most frequently, the user interface communicates with operating systems, other program modules, and/or the like. The user interface may contain, communicate, generate, obtain, and/or provide program module, system, user, and/or data communications, requests, and/or responses.

Web Browser

A Web browser module 918 is stored program code that is executed by the CPU. The Web browser may be a conventional hypertext viewing application such as Microsoft Internet Explorer or Netscape Navigator Secure Web browsing may be supplied with 128 bit (or greater) encryption by way of HTTPS, SSL, and/or the like. Some Web browsers allow for the execution of program modules through facilities such as Java, JavaScript, ActiveX, and/or the like. Web browsers and like information access tools may be integrated into PDAs, cellular telephones, and/or other mobile devices. A Web browser may communicate to and/or with other modules in a module collection, including itself, and/or facilities of the like. Most frequently, the Web browser communicates with information servers, operating systems, integrated program modules (e.g., plug-ins), and/or the like; e.g., it may contain, communicate, generate, obtain, and/or provide program module, system, user, and/or data communications, requests, and/or responses. Of course, in place of a Web browser and information server, a combined application may be developed to perform similar functions of both. The combined application would similarly affect the obtaining and the provision of information to users, user agents, and/or the like from TCAPS enabled nodes. The combined application may be nugatory on systems employing standard Web browsers.

TCAPS Database

A TCAPS database module 919 may be embodied in a database and its stored data. The database is stored program code, which is executed by the CPU; the stored program code portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the TCAPS database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the TCAPS database is implemented as a data-structure, the use of the TCAPS database may be integrated into another module such as the TCAPS module. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated. In one embodiment, the database module 919 includes three tables 919a-c. A user accounts table 919a includes fields such as, but not limited to: a user name, user address, user authorization information (e.g., user name, password, biometric data, etc.), user credit card, organization, organization account, TCAP unique identifier, account creation data, account expiration date; and/or the like. In one embodiment, user accounts may be activated only for set amounts of time and will then expire once a specified date has been reached. An user data table 919b includes fields such as, but not limited to: a TCAP unique identifier, backup image, data store, organization account, and/or the like. A user programs table 919c includes fields such as, but not limited to: system programs, organization programs, programs to be synchronized, and/or the like. In one embodiment, user programs may contain various user interface primitives, which may serve to update TCAPs. Also, various accounts may require custom database tables depending upon the environments and the types of TCAPs a TCAPS may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database modules 919a-c. The TCAPS may be configured to keep track of various settings, inputs, and parameters via database controllers.

A TCAPS database may communicate to and/or with other modules in a module collection, including itself, and/or facilities of the like. Most frequently, the TCAPS database communicates with a TCAPS module, other program modules, and/or the like. The database may contain, retain, and provide information regarding other nodes and data.

Cryptographic Server

A cryptographic server module 920 is stored program code that is executed by the CPU 903, cryptographic processor 926, cryptographic processor interface 927, cryptographic processor device 928, and/or the like. Cryptographic processor interfaces will allow for expedition of encryption and/or decryption requests by the cryptographic module; however, the cryptographic module, alternatively, may run on a conventional CPU. The cryptographic module allows for the encryption and/or decryption of provided data. The cryptographic module allows for both symmetric and asymmetric (e.g., Pretty Good Protection (PGP)) encryption and/or decryption. The cryptographic module may employ cryptographic techniques such as, but not limited to: digital certificates (e.g., X.509 authentication framework), digital signatures, dual signatures, enveloping, password access protection, public key management, and/or the like. The cryptographic module will facilitate numerous (encryption and/or decryption) security protocols such as, but not limited to: checksum, Data Encryption Standard (DES), Elliptical Curve Encryption (ECC), international Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adfeman), Secure Hash Algorithm (SHA), Secure Socket Layer (SSL), Secure Hypertext Transfer Protocol (HTTPS), and/or the like. Employing such encryption security protocols, the TCAPS may encrypt all incoming and/or outgoing communications and may serve as node within a virtual private network (VPN) with a wider communications network. The cryptographic module facilitates the process of "security authorization" whereby access to a resource is inhibited by a security protocol wherein the cryptographic module effects authorized access to the secured resource. In addition, the cryptographic module may provide unique identifiers of content, e.g., employing and MD5 hash to obtain a unique signature for an digital audio file. A cryptographic module may communicate to and/or with other modules in a module collection, including itself, and/or facilities of the like. The cryptographic module supports encryption schemes allowing for the secure transmission of information across a communications network to enable a TCAPS module to engage in secure transactions if so desired. The cryptographic module facilitates the secure accessing of resources on TCAPS and facilitates the access of secured resources on remote systems; i.e., it may act as a client and/or server of secured resources. Most frequently, the cryptographic module communicates with information servers, operating systems, other program modules, and/or the like. The cryptographic module may contain, communicate, generate, obtain, and/or provide program module, system, user, and/or data communications, requests, and/or responses.

TCAPS

A TCAPS module 935 is stored program code that is executed by the CPU. The TCAPS affects accessing, obtaining and the provision of information, services, transactions, and/or the like across various communications networks. The TCAPS enables TCAP users to simply access data and/or services across a communications network in a secure manner. The TCAPS extends the storage and processing capacities and capabilities of TCAPs. The TCAPS coordinates with the TCAPS database to identify interassociated items in the generation of entries regarding any related information. A TCAPS module enabling access of information between nodes may be developed by employing standard development tools such as, but not limited to: (ANSI) (Objective-) C (++), Apache modules, binary executables, Java, Javascript, mapping tools, procedural and object oriented development tools, PERL Python, shell scripts, SQL commands, web application server extensions, WebObjects, and/or the like. In one embodiment, the TCAPS server employs a cryptographic server to encrypt and decrypt communications. A TCAPS module may communicate to and/or with other modules in a module collection, including itself, and/or facilities of the like. Most frequently, the TCAPS module communicates with a TCAPS database, operating systems, other program modules, and/or the like. The TCAPS may contain, communicate, generate, obtain, and/or provide program module, system, user, and/or data communications, requests, and/or responses.

Distributed TCAP

The structure and/or operation of any of the TCAPS node controller components may be combined, consolidated, and/or distributed in any number of ways to facilitate development and/or deployment. Similarly, the module collection may be combined in any number of ways to facilitate deployment and/or development. To accomplish this, one may integrate the components into a common code base or in a facility that can dynamically load the components on demand in an integrated fashion.

The module collection may be consolidated and/or distributed in countless variations through standard data processing and/or development techniques. Multiple instances of any one of the program modules in the program module collection may be instantiated on a single node, and/or across numerous nodes to improve performance through load-balancing and/or data-processing techniques. Furthermore, single instances may also be distributed across multiple controllers and/or storage devices; e.g., databases. All program module instances and controllers working in conceit may do so through standard data processing communication techniques.

The configuration of the TCAPS controller will depend on the context of system deployment. Factors such as, but not limited to, the budget, capacity, location, and/or use of the underlying hardware resources may affect deployment requirements and configuration. Regardless of if the configuration results in more consolidated and/or integrated program modules, results in a more distributed series of program modules, and/or results in some combination between a consolidated and distributed configuration, data may be communicated, obtained, and/or provided. Instances of modules consolidated into a common code base from the program module collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If module collection components are discrete, separate, and/or external to one another, then communicating, obtaining, and/or providing data with and/or to other module components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like). Common Object Request Broker Architecture (CORBA), process pipes, shared files, and/or the like. Messages sent between discrete module components for inter-application communication or within memory spaces of a singular module for intra-application communication may be facilitated through the creation and parsing of a grammar. A grammar may be developed by using standard development tools such as lex, yacc, and/or the like, which allow for grammar generation and parsing functionality, which in turn may form the basis of communication messages within and between modules. Again, the configuration will depend upon the context of system deployment.

Tunneling Client Access Point Controller

Figure 10:
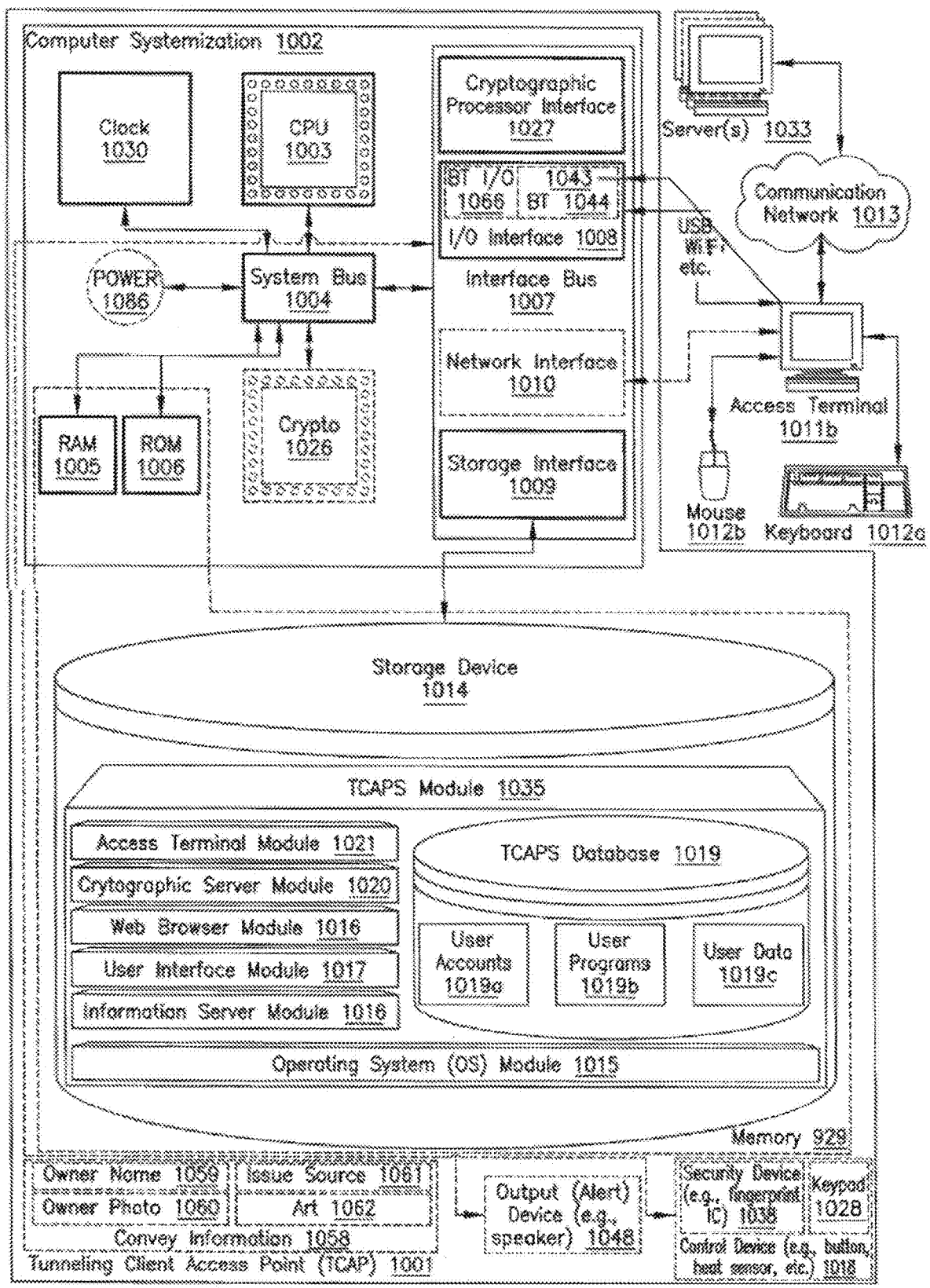
FIG. 10 is of a block diagram illustrating embodiments of a tunneling client access point controller, The leading number of each reference number within the drawings indicates the first figure in which that reference number is introduced. As such, reference number 101 is first introduced in FIG. 1. Reference number 201 is first introduced in FIG. 2, etc.

FIG. 10 illustrates one embodiment incorporated into a tunneling client access point (TCAP) controller 1001. Much of the description of the TCAPS of FIG. 9 applies to the TCAP, and as such, the disclosure focuses more upon the variances exhibited in the TCAP. In this embodiment, the TCAP controller 1001 may serve to process, store, search, identify, instruct, generate, match, and/or update data within itself, at a TCAPS, and/or through an AT.

The first and foremost difference between the TCAP and the TCAPS is that the TCAP is very small as was shown 130 of FIG. 1. The TCAP may be packaged in plugin sticks, often, smaller than the size of a human thumb. In one embodiment, a TCAP may be hardened for military use. In such an embodiment, the shell 1001 may be composed of metal, and/or other durable composites. Also, components within may be shielded from radiation.

In one embodiment, the TCAP controller 1001 may be connected to and/or communicate with entities such as, but not limited to: one or more users from an access terminal 1011*b*. The access terminal itself may be connected to peripherals such as user input devices (e.g., keyboard 1012*a*, mouse 1012*b*, etc.); and/or a communications network 1013 in manner similar to that described in FIG. 9.

A TCAP controller 1001 may be based on common computer systems components that may comprise, but are not limited to, components such as: a computer systemization 1002 connected to memory 1029. Optionally, the TCAP controller 1001 may convey information 1058, produce output through an output device 1048, and obtain input from control device 1018.

Control Device

The control device 1018 may be optionally provided to accept user input to control access to the TCAP controller. In one embodiment, the control device may provide a keypad 1028. Such a keypad would allow the user to enter passwords, personal identification numbers (PIN), and/or the like.

In an alternative embodiment, the control device may include a security device 1038. In one embodiment, the security device is a fingerprint integrated circuit (fingerprint IC) that provides biometric fingerprint information such as, but not limited to AuthenTec Inc.'s FingerLoc™ AF-S2™. Either a fingerprint IC and/or other biometric device will provide biometric validation information that may be used to confirm the identity of a TCAP user and ensure that transactions are legitimate. In alternative embodiments, a simple button, heat sensor, and/or other type of user input functionality may be provided solely and/or in concert with other types of control device types. The control device may be connected to the I/O interface, the system bus, or the CPU directly.

The output device 1048 is used to provide status information to the user. In one alternative embodiment, the output device is an LCD panel capable of providing alpha numeric and/or graphic displays. In an alternative embodiment, the output device may be a speaker providing audible signals indicating errors and/or actually streaming information that is audible to the user, such as voice alerts. The output device may be connected to the I/O interface, the system bus, or the CPU directly.

The conveyance information 1058 component of the TCAP controller may include any number of indicia representing the TCAP's source on the cover 1001. Source conveying indicia may include, but is not limited to: an owner name 1059 for readily verifying a TCAP user; a photo of the owner 1060 for readily verifying a TCAP controller owner; mark designating the source that issued the TCAP 1061, 1001 such as a corporate logo, and/or the like; fanciful design information 1062 for enhancing the visual appearance of the TCAP; and/or the like. It should be noted that the conveyance information 11421 may be positioned anywhere on the cover 1189.

Computer Systemization

A computer systemization 1002 may comprise a clock 1030, central processing unit (CPU) 1003, a read only memory (ROM) 1006, a random access memory (RAM) 1005, and/or an interface bus 1007, and most frequently, although not necessarily, are all interconnected and/or communicating through a system bus 1004. Optionally the computer systemization may be connected to an internal power source 1086. Optionally, a cryptographic processor 1026 may be connected to the system bus. The system clock typically has a crystal oscillator and provides a base signal. Of course, any of the above components may be connected directly to one another, connected to the CPU, and/or organized in numerous variations employed as exemplified by various computer systems.

The CPU comprises at least one low-power data processor adequate to execute program modules for executing user and/or system-generated requests. The CPU may be a microprocessor such as ARM's Application Cores, Embedded Cores, Secure Cores; Motorola's DragonBall; and/or the like processor(s).

Power Source

The power source 1086 may be of any standard form for powering small electronic circuit board devices such as but not limited to: alkaline, lithium hydride, lithium ion, nickel cadmium, solar cells, and/or the like. In the case of solar cells, the case provides an aperture through which the solar cell protrudes are to receive photonic energy. The power cell 1086 is connected to at least one of the interconnected subsequent components of the TCAP thereby providing an electric current to all subsequent components. In one example, the power cell 1086 is connected to the system bus component 1004. In an alternative embodiment, an outside power source 1086 is provided through a connection across the I/O 1008 interface. For example, a USB and/or IEEE 1394 connection carries both data and power across the connection and is therefore a suitable source of power.

Interface Adapters

Interface bus(ses) 1007 may accept, connect, and/or communicate to a number of interface adapters, conventionally although not necessarily in the form of adapter cards, such as but not limited to: input output interfaces (I/O) 1008, storage interfaces 1009, network interfaces 1010, and/or the like. Optionally, cryptographic processor interfaces 1027 similarly may be connected to the interface bus. The interface bus provides for the communications of interface adapters with one another as well as with other components of the computer systemization. Interface adapters are adapted for a compatible interface bus. In one embodiment, the interface bus provides I/O 1008 via a USB port. In an alternative embodiment, the interface bus provides I/O via an IEEE 1394 port. In an alternative embodiment, wireless transmitters are employed by interfacing wireless protocol integrated circuits (ICs) for I/O via the interface bus 1007.

Storage interfaces 1009 may accept, communicate, and/or connect to a number of storage devices such as, but not limited to: storage devices 1014, removable disc devices, and/or the like. Storage interfaces may employ connection protocols such as, but not limited to a flash memory connector, and/or the like. In one embodiment, an optional network interface may be provide 1010.

Input Output interfaces (I/O) 1008 may accept, communicate, and/or connect to an access terminal 1011b. I/O may employ connection protocols such as, but not limited to: Apple Desktop Bus (ADB); Apple Desktop Connector (ADC); IEEE 1394a-b; infrared; PC AT; PS/2, parallel; radio; serial; USB, and/or the like; wireless component; and/or the like.

Wireless Component

In one embodiment a wireless component may comprise a Bluetooth chip disposed in communication with a transceiver 1043 and a memory 1029 through the interface bus 1007 and/or system bus 1004. The transceiver may be either external to the Bluetooth chip, or integrated within the Bluetooth chip itself. The transceiver is a radio frequency (RF) transceiver operating in the range as required for Bluetooth transmissions. Further, the Bluetooth chip 1044 may integrate an input/output interface (I/O) 1066. The Bluetooth chip and its I/O may be configured to interface with the TCAP controller through the interface bus, the system buss, and/or directly with the CPU. The I/O may be used to interface with other components such as an access terminal 1011b equipped with similar wireless capabilities. In one embodiment, the TCAP may optionally interconnect wirelessly with a peripheral device 912 and/or a control device 911 of FIG. 9. In one example embodiment, the I/O may be based on serial line technologies, a universal serial bus (USB) protocol, and/or the like. In an alternative embodiment, the I/O may be based on the ISO 7816-3 standard. It should be noted that the Bluetooth chip in an alternative embodiment may be replaced with an IEEE 802.11b wireless chip. In another embodiment, both a Bluetooth chip and an IEEE 802.11b wireless chip may be used to communicate and or bridge communications with respectively enabled devices. It should further be noted that the transceiver 1043 may be used to wirelessly communicate with other devices powered by Bluetooth chips and/or IEEE 802.11b chips and/or the like. The ROM can provide a basic instruction set enabling the Bluetooth chip to use its I/O to communicate with other components. A number of Bluetooth chips are commercially available, and may be used as a Bluetooth chip in the wireless component, such as, but not limited to, CSR's BlueCore line of chips. If IEEE 802.11b functionality is required, a number of chips are commercially available for the wireless component as well.

Cryptographic units such as, but not limited to, microcontrollers, processors 1026, and/or interfaces 1027 may be attached, and/or communicate with the TCAP controller. A Secure Core component commonly manufactured by ARM, Inc. and may be used for and/or within cryptographic units.

Memory

Generally, any mechanization and/or embodiment allowing a processor to affect the storage and/or retrieval of information is regarded as memory 1029. However, memory is a fungible technology and resource, thus, any number of memory embodiments may be employed in lieu of or in concert with one another. It is to be understood that a TCAP controller and/or a computer systemization may employ various forms of memory 1029. In a typical configuration, memory 1029 will include ROM 1006, RAM 1005, and a storage device 1014. A storage device 1014 may be any conventional computer system storage. Storage devices may include flash memory, micro hard drives, and/or the like.

Module Collection

The memory 1029 may contain a collection of program and/or database modules and/or data such as, but not limited to, operating system module(s) 1015 (operating system); information server module(s) 1016 (information server); user interface module(s) 1017 (user interface); Web browser module(s) 1018 (Web browser); database(s) 1019; cryptographic server module(s) 1020 (cryptographic server); access terminal module 1021; TCAP module(s) 1035; and/or the like (i.e., collectively a module collection). These modules may be stored and accessed from the storage devices and/or from storage devices accessible through an interface bus. Although non-conventional software modules such as those in the module collection, typically, are stored in a local storage device 1014, they may also be loaded and/or stored in memory such as: peripheral devices, RAM, remote storage facilities through an access terminal, communications network, ROM, various forms of memory, and/or the like. In one embodiment, all data stored in memory is encrypted by employing the cryptographic server 1020 as described in further detail below. In one embodiment, the ROM contains a unique TCAP identifier. For example, the TCAP may contain a unique digital certificate, number, and/or the like, which may be used for purposes of verification and encryption across a network and/or in conjunction with a TCAPS.

Operating System

The operating system module 1015 is executable program code facilitating the operation of a TCAP controller. Typically, the operating system facilitates access of I/O, network interlaces, peripheral devices, storage devices, and/or the like. The operating system may be a highly fault tolerant, scalable, and secure system such as Linux, and/or the like operating systems. However, more limited and/or less secure operating systems also may be employed such as Java runtime OS, and/or the like. An operating system may communicate to and/or with other modules in a module collection, including itself, and/or the like. Most frequently, the operating system communicates with other program modules, user interfaces, and/or the like. For example, the operating system may contain, communicate, generate, obtain, and/or provide program module, system, user, and/or data communications, requests, and/or responses. The operating system, once executed by the CPU, may enable the interaction with an access terminal, communications networks, data, I/O, peripheral devices, program modules, memory, user input devices, and/or the like. The operating system may provide communications protocols that allow the TCAP controller to communicate with other entities through an access terminal. Various communication protocols may be used by the TCAP controller as a subcarrier transport mechanism for interaction, such as, but not limited to: TCP/IP, USB, and/or the like.

Information Server

An information server module 1016 is stored program code that is executed by the CPU. The information server may be a conventional Internet information server such as, but not limited to Apache Software Foundation's Apache, and/or the like. The information server may allow for the execution of program modules through facilities such as Active Server Page (ASP), ActiveX, (ANSI) (Objective-) C (++), Common Gateway Interface (CGI) scripts, Java, JavaScript, Practical Extraction Report Language (PERL), Python, WebObjects, and/or the like. The information server may support secure communications protocols such as, but not limited to, File Transfer Protocol (FTP); HyperText Transfer Protocol (HTTP); Secure Hypertext Transfer Protocol (HTTPS). Secure Socket Layer (SSL), anchor the like. The information server provides results in the form of Web pages to Web browsers, and allows for the manipulated generation of the Web pages through interaction with other program modules. An information server may communicate to and/or with other modules in a module collection, including itself, and/or facilities of the like. Most frequently, the information server communicates with the TCAP database 1019, operating systems, other program modules, user interfaces, Web browsers, and/or the like.

Access to TCAP database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the TCAP. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the TCAP as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program module, system, user, and/or data communications, requests, and/or responses.

User Interface

A user interface module 1017 is stored program code that is executed by the CPU. The user interface may be a conventional graphic user interface as provided by, with, and/or atop operating systems and/or operating environments such as Apple Macintosh OS, e.g., Aqua, Microsoft Windows (NT/XP), Unix X Windows (KDE, Gnome, and/or the like), and/or the like. The TCAP may employ code natively compiled for various operating systems, or code compiled using Java. The user interface may allow for the display, execution, interaction, manipulation, and/or operation of program modules and/or system facilities through textual and/or graphical facilities. The user interface provides a facility through which users may affect, interact, and/or operate a computer system. A user interface may communicate to and/or with other modules in a module collection, including itself, and/or facilities of the like. Most frequently, the user interface communicates with operating systems, other program modules, and/or the like. The user interface may contain, communicate, generate, obtain, and/or provide program module, system, user, and/or data communications, requests, and/or responses.

Web Browser

A Web browser module 1018 is stored program code that is executed by the CPU. A small-scale embedded Web browser may allow the TCAP to access and communicate with an attached access terminal, and beyond across a communications network. An example browser is Blazer, Opera, Firebox, etc. A browsing module may contain, communicate, generate, obtain, and/or provide program module, system, user, and/or data communications, requests, and/or responses. Of course, in place of a Web browser and information server, a combined application may be developed to perform similar functions of both. The combined application would similarly affect the obtaining and the provision of information to users, user agents, and/or the like from TCAP enabled nodes. The combined application may be nugatory on systems employing standard Web browsers.

TCAP Database

A TCAP database module 1019 may be embodied in a database and its stored data. The database is stored program code, which is executed by the CPU; the stored program code portion configuring the CPU to process the stored data. In one embodiment, the TCAP database may be implemented using various standard data-structures, such as an array, hash, (linked) list, struct, structured text file (e.g., XML), table, and/or the like. Such data-structures may be stored in memory and/or in (structured) files. If the TCAP database is implemented as a data-structure, the use of the TCAP database may be integrated into another module such as the TCAP module. Databases may be consolidated and/or distributed in countless variations through standard data processing techniques. Portions of databases, e.g., tables, may be exported and/or imported and thus decentralized and/or integrated. In one embodiment, the database module 1019 includes three tables 1019*a-c*. A user accounts table 1019*a* includes fields such as, but not limited to: a user name, user address, user authorization information (e.g., user name, password, biometric data, etc.), user credit card, organization, organization account, TCAP unique identifier, account creation data, account expiration date; and/or the like. In one embodiment, user accounts may be activated only for set amounts of time and will then expire once a specified date has been reached. An user data table 1019*b* includes fields such as, but not limited to: a TCAP unique identifier, backup image, data store, organization account, and/or the like. In one embodiment, the entire TCAP memory 1029 is processes into an image and spooled to a TCAPS for backup storage. A user programs table 1019*c* includes fields such as, but not limited to: system programs, organization programs, programs to be synchronized, and/or the like. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database modules 1019*a-c*. The TCAP may be configured to keep track of various settings, inputs, and parameters via database controllers.

A TCAP database may communicate to and/or with other modules in a module collection, including itself, and/or facilities of the like. Most frequently, the TCAP database communicates with a TCAP module, other program modules, and/or the like. The database may contain, retain, and provide information regarding other nodes and data.

Cryptographic Server

A cryptographic server module 1020 is stored program code that is executed by the CPU 1003, cryptographic processor 1026, cryptographic processor interface 1027, and/or the like. Cryptographic processor interfaces will allow for expedition of encryption and/or decryption requests by the cryptographic module; however, the cryptographic module, alternatively, may run on a conventional CPU. The cryptographic module allows for the encryption and/or decryption of provided data. The cryptographic module allows for both symmetric and asymmetric (e.g., Pretty Good Protection (PGP)) encryption and/or decryption. The cryptographic module may employ cryptographic techniques such as, but not limited to: digital certificates (e.g., X.509 authentication framework), digital signatures, dual signatures, enveloping, password access protection, public key management, and/or the like. The cryptographic module will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. The cryptographic module facilitates the process of "security authorization" whereby access to a resource is inhibited by a security protocol wherein the cryptographic module effects authorized access to the secured resource. In addition, the cryptographic module may provide unique identifiers of content, e.g., employing and MD5 hash to obtain a unique signature for an digital audio file. A cryptographic module may communicate to and/or with other modules in a module collection, including itself, and/or facilities of the like. The cryptographic module supports encryption schemes allowing for the secure transmission of information across a communications network to enable a TCAP module to engage in secure transactions if so desired. The cryptographic module facilitates the secure accessing of resources on TCAP and facilitates the access of secured resources on remote systems; i.e., it may act as a client and/or server of secured resources. Most frequently, the cryptographic module communicates with information servers, operating systems, other program modules, and/or the like. The cryptographic module may contain, communicate, generate, obtain, and/or provide program module, system, user, and/or data communications, requests, and/or responses. In one embodiment, the TCAP employs the cryptographic server to encrypt all data stored in memory 1029 based on the TCAP's unique ID and user's authorization information. In another embodiment, the TCAP employs the cryptographic server to encrypt all data sent through the access terminal based in the TCAP's unique ID and user's authorization information.

TCAP

A TCAP module 1035 is stored program code that is executed by the CPU. The TCAP affects accessing, obtaining and the provision of information, services, storage, transactions, and/or the like within its memory and/or across various communications networks. The TCAP enables users to simply access data and/or services from any location where an access terminal is available. It provides secure, extremely tow powerful and ultra portable access to data and services that were heretofore impossible. The TCAP coordinates with the TCAP database to identify interassociated items in the generation of entries regarding any related information. A TCAP module enabling access of information between nodes may be developed by employing standard development tools such as, but not limited to: (ANSI) (Objective-) C (++), Apache modules, binary executables, Java, Javascript, mapping tools, procedural and object oriented development tools, PERL, Python, shell scripts, SQL commands, web application server extensions, WebObjects, and/or the like. In one embodiment, the TCAP server employs a cryptographic server to encrypt and decrypt communications. A TCAP module may communicate to and/or with other modules in a module collection, including itself, and/or facilities of the like. Most frequently, the TCAP module communicates with a TCAP database, a TCAP access terminal module 1021 running on an access terminal 1011*b*, operating systems, other program modules, and/or the like. The TCAP may contain, communicate, generate, obtain, and/or provide program module, system, user, and/or data communications, requests, and/or responses.

Access Terminal Module

An access terminal module 1021 is stored program code that is executed by a CPU. In one embodiment, the TCAP allows the access terminal 1011*b* to access its memory 1029 across its I/O 1008 and the access terminal executes the module. The access terminal module affects accessing, obtaining and the provision of information, services, storage, transactions, and/or the like within the TCAP's and access terminal's memory and/or across various communications networks. The access terminal module 1021 acts as a bridge through which the TCAP can communicate with communications network, and through which users may interact with the TCAP by using the I/O of the access terminal. The access terminal module coordinates with the TCAP module 1035 to send data and communications back and forth. A access terminal module enabling access of information between the TCAP and access terminal may be developed by employing standard development tools such as, but not limited to: (ANSI) (Objective-) C (++), Apache modules, binary executables, Java, Javascript, mapping tools, procedural and object oriented development tools, PERL, Python, shell scripts, SQL commands, web application server extensions, WebObjects, and/or the like. In one embodiment, the access terminal module is compiled for target access terminal platform, e.g., for Windows. In an alternative embodiment a processor independent approach is taken, e.g., Java is used, so that the access terminal module will run on multiple platforms. In another embodiment, the TCAP server employs a cryptographic server to encrypt and decrypt communications as between it, the TCAP, and outside servers. A access terminal module may communicate to and/or with other modules in a module collection, including itself, and/or facilities of the like. Most frequently, the access terminal module communicates with a TCAP, other program modules, and/or the like. The access terminal module may contain, communicate, generate, obtain, and/or provide program module, system, user, and/or data communications, requests, and/or responses.

Distributed TCAP

The structure and/or operation of any of the TCAP node controller components may be combined, consolidated, and/or distributed in any number of ways to facilitate development and/or deployment. Similarly, the module collection may be combined in any number of ways to facilitate deployment and/or development. To accomplish this, one may integrate the components into a common code base or in a facility that can dynamically load the components on demand in an integrated fashion.

The module collection may be consolidated and/or distributed in countless variations through standard data processing and/or development techniques. Multiple instances of any one of the program modules in the program module collection may be instantiated on a single node, and/or across numerous nodes to improve performance through load-balancing and/or data-processing techniques. Furthermore, single instances may also be distributed across multiple controllers and/or storage devices; e.g., databases. All program module instances and controllers working in concert may do so through standard data processing communication techniques.

The configuration of the TCAP controller will depend on the context of system deployment. Factors such as, but not limited to, the budget, capacity, location, and/or use of the underlying hardware resources may affect deployment requirements and configuration. Regardless of if the configuration results in more consolidated and/or integrated program modules, results in a more distributed series of program modules, and/or results in some combination between a consolidated and distributed configuration, data may be communicated, obtained, and/or provided. Instances of modules consolidated into a common code base from the program module collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If module collection components are discrete, separate, and/or external to one another, then communicating, obtaining, and/or providing data with and/or to other module components may be accomplished through inter-application data processing communication techniques such as, but not limited to: Application Program Interfaces (API) information passage, (distributed) Component Object Model ((D)COM), (Distributed) Object Linking and Embedding ((D)OLE), and/or the like), Common Object Request Broker Architecture (CORBA), process pipes, shared files, and/or the like. Messages sent between discrete module components for inter-application communication or within memory spaces of a singular module for intra-application communication may be facilitated through the creation and parsing of a grammar. A grammar may be developed by using standard development tools such as lex, yacc, and/or the like, which allow for grammar generation and parsing functionality, which in turn may form the basis of communication messages within and between modules. Again, the configuration will depend upon the context of system deployment.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than for purposes of space and reducing repetition. For instance, it is to be understood that the logical and/or topological structure of any combination of any program modules (a module collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, simultaneously, synchronously, and/or the like are contemplated by the disclosure. As such, some of these features may be mutually contradictory, in that they cannot be simultaneously present in a single embodiment, Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

The invention claimed is:

1. A portable device configured to communicate with (i) a terminal comprising a processor, an output component, and a memory having executable program code stored thereon, including program code which, when executed by the terminal processor, is configured to facilitate secure transmission of encrypted digital data communications between the portable device and the terminal, (ii) a communications network comprising a plurality of communications network nodes, wherein the communications network comprises the internet and at least one communications network node comprises an internet server, and (iii) an input device, the portable device comprising:

(a) a first communication interface configured to enable the transmission of communications between the portable device and the terminal;

(b) a second communication interface configured to enable the transmission of communications between the portable device and a communications network node;

(c) a third communication interface configured to enable the transmission of communications between the portable device and the input device;

(d) a processor; and (e) a memory having executable program code stored thereon, including:

(1) first program code which, when executed by the portable device processor, is configured to coordinate with program code executed by the terminal processor to facilitate the secure transmission of encrypted digital data communications between the portable device and the terminal;

(2) second program code which, when executed by the portable device processor, is configured to (i) cause an interactive user interface comprising at least one user interface element to be presented by the terminal output component, (ii) receive a communication through the third communication interface from the input device to facilitate manipulation of a user interface element of the interactive user interface, and (iii) in response to receiving a communication from the input device to facilitate manipulation of a user interface element of the interactive user interface, cause a secure encrypted digital data communication to be transmitted through the first communication interface to the terminal to affect the presentation of the interactive user interface; and (3) third program code which, when executed by the portable device in response to receiving a communication from the input device to facilitate manipulation of a user interface element of the interactive user interface, is configured to cause a secure encrypted digital data communication to be transmitted through the second communication interface to an internet server.

2. The portable device according to claim 1, wherein the third program code, when executed by the portable device processor, is configured to cause a secure encrypted digital data communication to be transmitted through the second communication interface to the internet server to facilitate a payment transaction.

3. The portable device according to claim 1, wherein the third program code, when executed by the portable device processor, is configured to cause a secure encrypted digital data communication to be transmitted through the second communication interface to the internet server to facilitate a download of digital data from a communications network node to the portable device.

4. The portable device according to claim 3, wherein the executable program code stored on the portable device memory further comprises fourth program code which, when executed by the portable device processor, is configured to cause secure communications comprising encrypted digital data downloaded from the communications network node to the portable device to be transmitted through the first communication interface to affect a presentation of the data by the terminal output component.

5. The portable device according to claim 4, wherein the first program code, when executed by the portable device processor, is configured to coordinate with program code executed by the terminal processor to facilitate a key exchange between the portable device and the terminal to enable the portable device to transmit encrypted digital data communications to the terminal, and wherein the executable program code stored on the portable device memory further comprises fifth program code which, when executed by the portable device processor, is configured to enable the portable device to employ the key exchange to encrypt the digital data downloaded from the communications network node and transmit the encrypted digital data through the first communication interface to affect a presentation of the digital data by the terminal output component the presentation of the data by the terminal output component comprises a data stream.

6. The portable device according to claim 5, wherein the presentation of the digital data by the terminal output component comprises a data stream.

7. The portable device according to claim 6, wherein the data stream comprises video content.

8. The portable device according to claim 6, wherein the data stream comprises bitmapped format data.

9. The portable device according to claim 6, wherein the data stream comprises digital data content of a live event.

10. The portable device according to claim 6, wherein the data stream comprises real time data content.

11. The portable device according to claim 5, wherein the presentation of the digital data by the terminal output component comprises advertisement content.

12. The portable device according to claim 1, wherein the executable program code stored on the portable device memory further comprises fourth program code which, when executed by the portable device processor in response to receiving a communication from the input device, is configured to facilitate user authentication.

13. The portable device according to claim 12, wherein the portable device processor is configured to execute the fourth program code to facilitate user authentication in response to receiving a communication from the input device comprising user biometric information.

14. The portable device according to claim 12, wherein the portable device processor is configured to execute the fourth program code to facilitate user authentication to enable access to secure data stored on the portable device memory.

15. The portable device according to claim 1, wherein the third program code, when executed by the portable device processor, is configured to cause an encrypted digital data communication to be transmitted through the second communication interface to the internet server to facilitate synchronizing digital data stored on the portable device memory with digital data stored on a communications network node.

16. The portable device according to claim 15, wherein the second program code, when executed by the portable device processor, is further configured to process the synchronized digital data stored on the portable device for transmission to the terminal to affect the presentation of the interactive user interface.

17. The portable device according to claim 1, wherein the third program code, when executed by the portable device processor, is configured to cause an encrypted digital data communication comprising a portable device identifier to be transmitted through the second communication interface to the internet server to facilitate portable device authentication.

18. The portable device according to claim 1, wherein the portable device memory comprises a portable device identifier stored thereon; and wherein the third program code, when executed by the portable device processor, is configured to cause an encrypted digital data communication comprising the portable device identifier to be transmitted through the second communication interface to the internet server to facilitate a secure payment transaction.

19. The portable device according to claim 1, wherein the third program code, when executed by the portable device processor, is configured to cause an encrypted digital data communication to be transmitted through the second communication interface to the internet server to facilitate a download of program code from a communications network node to the portable device.

20. The portable device according to claim 1, wherein the third program code, when executed by the portable device processor, is configured to cause an encrypted digital data communication to be transmitted through the second communication interface to the internet server to facilitate synchronizing program code stored on the portable device memory with program code stored on a communications network node.

21. The portable device according to claim 1, wherein the third program code, when executed by the portable device processor, is configured to cause an encrypted digital data communication to be transmitted through the second communication interface to the internet server to facilitate user registration.

22. The portable device according to claim 1, wherein the portable device processor comprises a cryptographic processor configured to encrypt digital data communications transmitted by the portable device and decrypt encrypted digital data communications received by the portable device.

23. The portable device according to claim 1, wherein the first communication interface is further configured to enable the transmission of power from the terminal to the portable device.

24. The portable device according to claim 1, wherein encrypted digital data communication transmitted through the second communication interface between the portable device and network server employs a communication protocol comprising one or more of TCP/IP, UDP, multicast, unicast, and the like.

25. The portable device according to claim 1, wherein the terminal further comprises a communication interface configured to enable the transmission of communications between the terminal and a communications network node, and wherein the portable device is configured to cause a secured encrypted communication to be transmitted through the terminal communication interface to a communications network node.

26. The portable device according to claim 1, wherein the executable program code stored on the portable device memory further comprises fourth program code which, when executed by the portable device processor in response to receiving a communication from the input device, is configured to cause an encrypted digital data communication to be transmitted through the second communication interface to a communications network node to facilitate synchronizing digital data stored on the portable device memory with digital data stored on a communications network node.

27. The portable device according to claim 26, wherein the input device further comprises a sensor for detecting an individual's biometric information and wherein the portable device processor is configured to execute the fourth program code in response to receiving a communication from the input device caused by the input device sensor detection of an individual's biometric information.

28. The portable device according to claim 26, wherein the input device further comprises a keypad comprising at least one user interface element and wherein the portable device processor is configured to execute the fourth program code in response to receiving a communication from the input device caused by manipulation of a user interface element of the input device keypad.

29. The portable device according to claim 26, wherein the encrypted digital data communication transmitted through the second communication interface to the communications network node employs a communication protocol comprising one or more of TCP/ID, UDP, multicast, unicast, and the like.

30. The portable device according to claim 26, wherein the digital data stored on the portable device memory synchronized with the digital data stored on the communications network node comprises one or more of a credit card number, a credit card expiration date, a credit card issuer, an individual's name, a mailing address, an email address, and the like.

* * * * *